US012005675B2

(12) United States Patent
Matsumoto et al.

(10) Patent No.: US 12,005,675 B2
(45) Date of Patent: Jun. 11, 2024

(54) MEDIUM PROCESSING APPARATUS AND IMAGE FORMING SYSTEM INCORPORATING SAME

(71) Applicants: Takamasa Matsumoto, Kanagawa (JP); Kei Sasaki, Kanagawa (JP); Kazuki Seto, Kanagawa (JP); Yasushi Tsuruoka, Kanagawa (JP)

(72) Inventors: Takamasa Matsumoto, Kanagawa (JP); Kei Sasaki, Kanagawa (JP); Kazuki Seto, Kanagawa (JP); Yasushi Tsuruoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/162,112

(22) Filed: Jan. 31, 2023

(65) Prior Publication Data

US 2023/0241860 A1 Aug. 3, 2023

(30) Foreign Application Priority Data

Feb. 3, 2022 (JP) ................................ 2022-015683
Nov. 29, 2022 (JP) ................................ 2022-190398

(51) Int. Cl.
*B65H 37/04* (2006.01)
*B31F 5/02* (2006.01)
*B65H 43/00* (2006.01)

(52) U.S. Cl.
CPC ............... *B31F 5/02* (2013.01); *B65H 37/04* (2013.01); *B65H 43/00* (2013.01); *B65H 2301/5142* (2013.01); *B65H 2553/00* (2013.01)

(58) Field of Classification Search
CPC .. B65H 2301/5142; B65H 2301/51616; B65H 2301/43828; B65H 37/04; B31F 5/02
See application file for complete search history.

(56) References Cited

U.S. PATENT DOCUMENTS

2014/0161565 A1* 6/2014 Obuchi ..................... B31F 5/02 412/33
2018/0339485 A1* 11/2018 Takahashi ................. B42C 1/12
2022/0394145 A1 12/2022 Seto et al.

FOREIGN PATENT DOCUMENTS

JP 2014201432 A * 10/2014
JP 6202377 B2 * 9/2017
JP 2019-010811 1/2019

OTHER PUBLICATIONS

U.S. Appl. No. 18/153,023, filed Jan. 11, 2023, Junya Suzuki, et al.

(Continued)

*Primary Examiner* — Jennifer Bahls
(74) *Attorney, Agent, or Firm* — IPUSA, PLLC

(57) ABSTRACT

A medium processing apparatus includes a crimper, a liquid applier, a driving source, and a binding load detector. The crimper presses and deforms a part of a medium bundle, which is a plurality of sheet-shaped media bundled, to bind the medium bundle. The liquid applier applies liquid to a position on the media at which binding is to be performed by the crimper. The driving source operates the crimper. The binding load detector detects a load of the crimper during the binding. The liquid applier adjusts an amount of the liquid to be applied to the media in accordance with a magnitude of the load during the binding detected by the binding load detector.

8 Claims, 22 Drawing Sheets

(56) References Cited

OTHER PUBLICATIONS

U.S. Appl. No. 18/157,142, filed Jan. 20, 2023, Kensuke Fukuchi, et al.

* cited by examiner

MEDIUM PROCESSING APPARATUS AND IMAGE FORMING SYSTEM INCORPORATING SAME

CROSS-REFERENCE TO RELATED APPLICATIONS

This patent application is based on and claims priority pursuant to 35 U.S.C. § 119(a) to Japanese Patent Application Nos. 2022-015683, filed on Feb. 3, 2022, and 2022-190398, filed on Nov. 29, 2022, in the Japan Patent Office, the entire disclosure of each of which is hereby incorporated by reference herein.

BACKGROUND

Technical Field

Medium processing apparatuses are known in the art that perform binding to form a sheet bundle, which is a bundle of stacked sheet-shaped media on which images are formed. Some medium processing apparatuses are known in the art that perform binding without metal binding needles (i.e., staples) from a viewpoint of resource saving and reduction in environmental load. Such medium processing apparatuses include a crimper that can perform so-called "crimp binding." Specifically, the crimper sandwiches a sheet bundle with serrate binding teeth to press and deform the sheet bundle. Sheets of paper are widely known as an example of sheet-shaped media. For this reason, in the following description, a bundle of sheets of paper as a plurality of media is an example of a sheet bundle.

An increased number of sheets of the sheet bundle hamper the binding teeth in biting into the sheet bundle and may cause some sheets to peel off from the sheet bundle crimped and bound. Thus, the crimp binding may have some disadvantages in the binding strength and keeping of the binding state. To enhance the binding strength, some medium processing apparatuses that perform the crimp binding include a liquid applier that applies liquid in advance to a position on a sheet where the binding teeth contact the sheet, to allow the binding teeth to easily bite into a sheet bundle.

SUMMARY

According to an embodiment of the present disclosure, a medium processing apparatus includes a crimper, a liquid applier, a driving source, and a binding load detector. The crimper presses and deforms a part of a medium bundle, which is a plurality of sheet-shaped media bundled, to bind the medium bundle. The liquid applier applies liquid to a position on the media at which binding is to be performed by the crimper. The driving source operates the crimper. The binding load detector detects a load of the crimper during the binding. The liquid applier adjusts an amount of the liquid to be applied to the media in accordance with a magnitude of the load during the binding detected by the binding load detector.

According to another embodiment of the present disclosure, an image forming system includes an image forming apparatus and the medium processing apparatus. The image forming apparatus includes an image former configured to form images on a plurality of media. The medium processing apparatus presses and deforms the plurality of media, on which the images are formed by the image forming apparatus, to bind the plurality of media.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
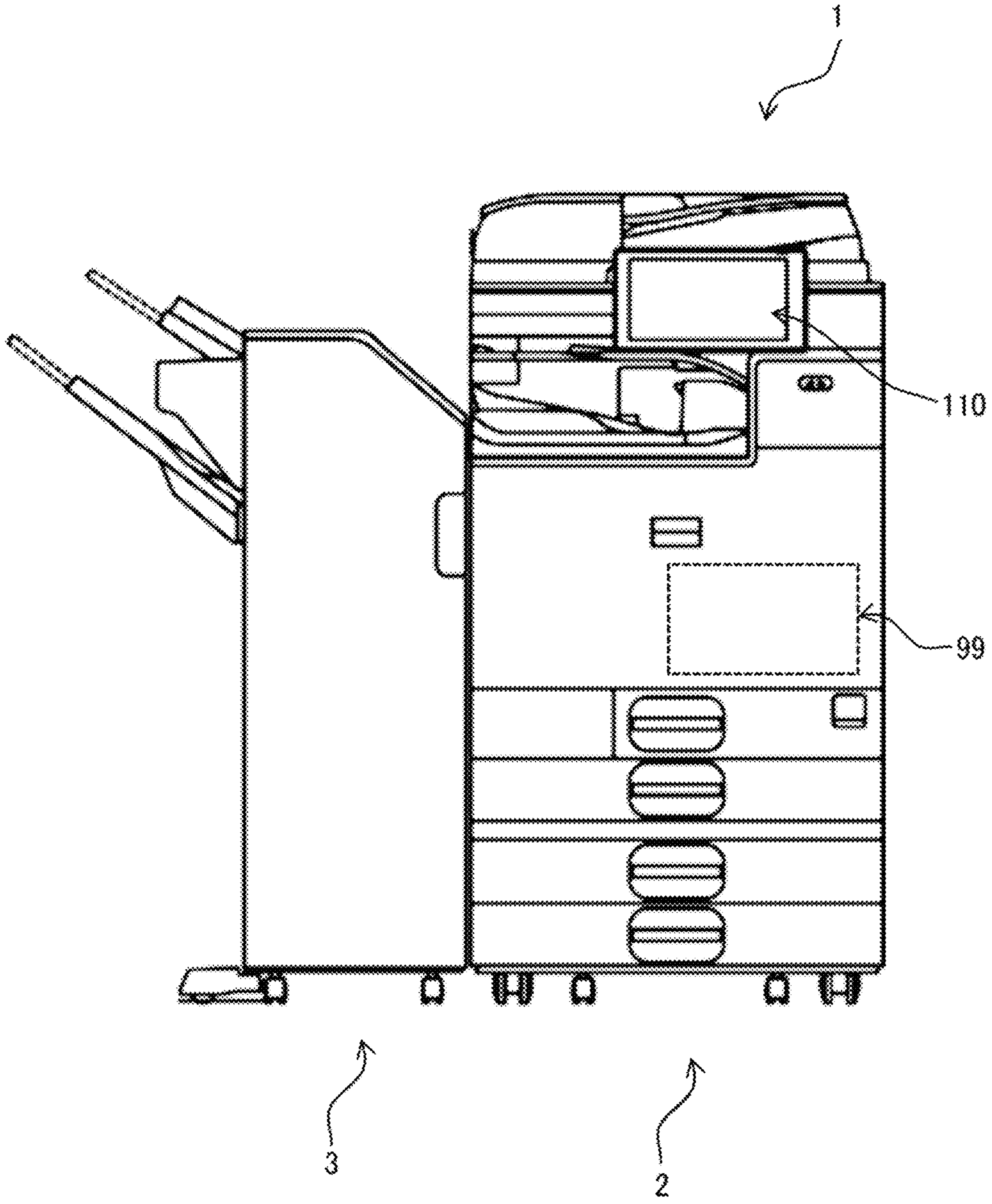
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Hereinafter, an embodiment of the present disclosure applied to a color laser printer (hereinafter, simply referred to as a printer) that is an image forming apparatus will be described.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Initially, a description is given of a first embodiment of the present disclosure.

With reference to the drawings, a description is now given of an image forming system 1 according to an embodiment of the present disclosure. FIG. 1 is a diagram illustrating the overall configuration of the image forming system 1. The image forming system 1 has a function of forming an image on a sheet P as a sheet-shaped medium and performing post-processing on the sheet P on which the image is formed. As illustrated in FIG. 1, the image forming system 1 includes an image forming apparatus 2 and a post-processing apparatus 3 serving as a medium processing apparatus according to the embodiments of the present disclosure. In the image forming system 1, the image forming apparatus 2 and the post-processing apparatus 3 operate in conjunction with each other.

The image forming apparatus 2 forms an image on the sheet P and outputs the sheet P bearing the image to the post-processing apparatus 3. The image forming apparatus 2 includes an accommodation tray that accommodates the sheet P, a conveyor that conveys the sheet P accommodated in the accommodation tray, and an image former 99 that forms an image on the sheet P conveyed by the conveyor. The image former 99 may be an inkjet image forming device that forms an image with ink or an electrophotographic image forming device that forms an image with toner. Since the image forming apparatus 2 has a typical configuration, a detailed description of the configuration and functions of the image forming apparatus 2 are omitted.

Figure 2:
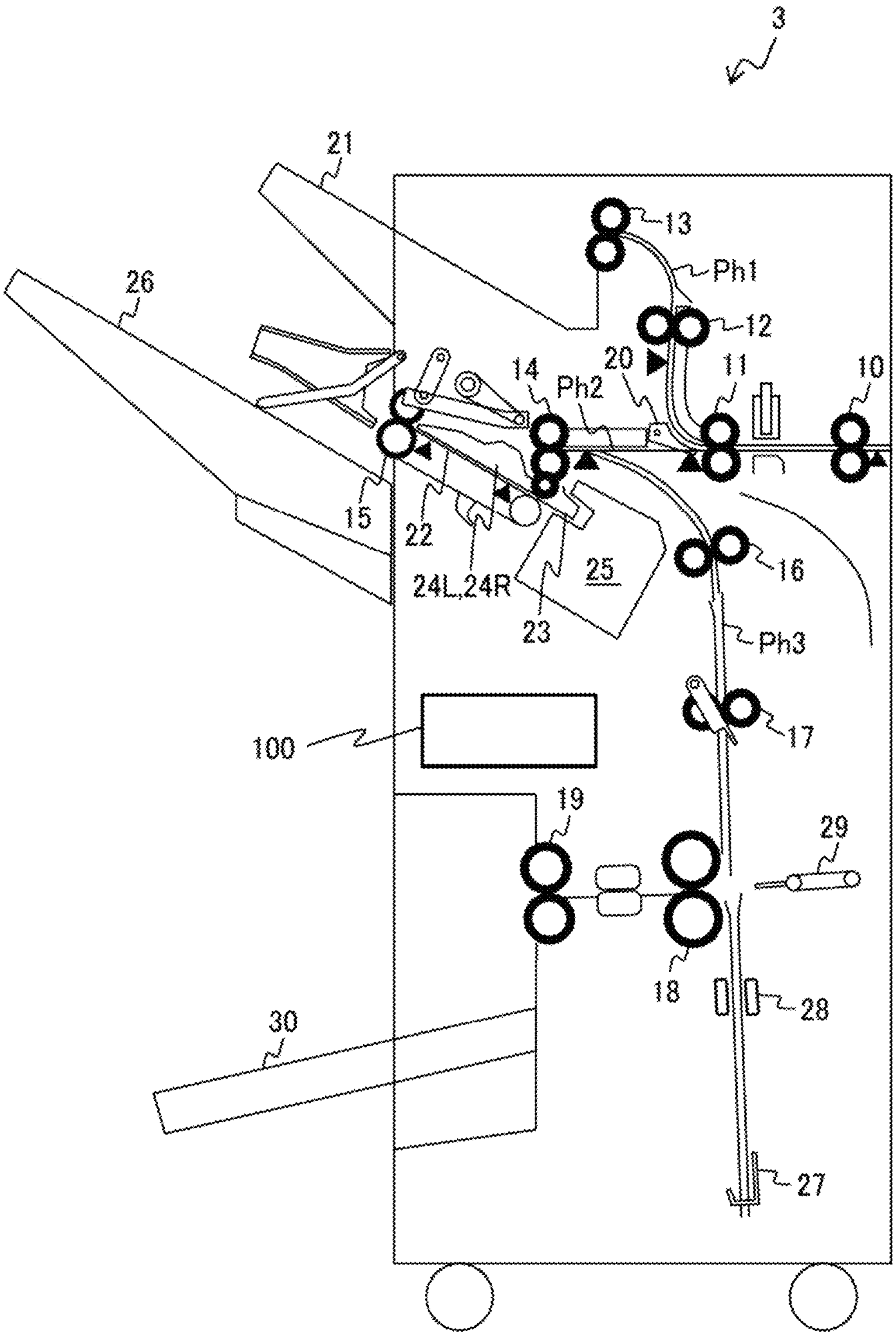
FIG. 2 is a diagram illustrating an internal configuration of a post-processing apparatus according to a first embodiment of the present disclosure.

FIG. 2 is a diagram illustrating an internal configuration of the post-processing apparatus 3 according to the first embodiment of the present disclosure. The post-processing apparatus 3 performs given post-processing on the sheet P on which an image is formed by the image forming apparatus 2. The post-processing according to the present embodiment is binding or a binding process as "crimp binding process" to bind, without staples, a bundle (sheet bundle) of a plurality of sheets P on which images are formed. In the following description, the bundle of sheets P may be referred to as a "sheet bundle Pb" as a bundle of media. More specifically, the binding according to the present embodiment is so-called "crimp binding," in other words, pressing and deforming the sheet bundle Pb at a binding position. The binding that can be executed by the post-processing apparatus 3 includes edge stitching and saddle stitching. The edge stitching is a process to bind an edge of the sheet bundle Pb. The saddle stitching is a process to bind the center of the sheet bundle Pb.

The post-processing apparatus 3 includes the conveyance roller pairs 10 to 19 each functioning as a conveyor and the switching claw 20. The conveyance roller pairs 10 to 19 convey, inside the post-processing apparatus 3, the sheet P supplied from the image forming apparatus 2. Specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph1 is a passage extending to an output tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to an output tray 26 via an internal tray 22. The third conveyance passage Ph3 is a passage branching from the first conveyance passage Ph1 between the conveyance roller pairs 11 and 14 in the conveyance direction and extending to an output tray 30.

The switching claw 20 is disposed at a branching position of the first conveyance passage Ph1 and the second conveyance passage Ph2. The switching claw 20 can be switched between a first position and a second position. The switching claw 20 in the first position guides the sheet P to be output to the output tray 21 through the first conveyance passage Ph1. The switching claw 20 in the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in the reverse direction to guide the sheet P to the third conveyance passage Ph3. The post-processing apparatus 3 further includes a plurality of sensors that detects the positions of the sheet P in the first conveyance passage Ph1, the second conveyance passage Ph2, and the third conveyance passage Ph3. Note that each of the plurality of sensors is indicated by a black triangle in FIG. 2.

The post-processing apparatus 3 includes the output tray 21. The sheet P that is output through the first conveyance passage Ph1 rests on the output tray 21. Among the sheets P supplied from the image forming apparatus 2, the sheets P that are not bound are output to the output tray 21.

The post-processing apparatus 3 further includes the internal tray 22 serving as a receptacle, an end fence 23, side fences 24L and 24R, an edge binder 25, and the output tray 26. The internal tray 22, the end fence 23, the side fences 24L and 24R, and the edge binder perform the edge stitching on the sheets P conveyed through the second conveyance passage Ph2. Among the sheets P supplied from the image forming apparatus 2, the sheet bundle Pb subjected to the edge stitching is output to the output tray 26.

In the following description, a direction in which the sheet P is conveyed from the conveyance roller pair 15 toward the end fence 23 is defined as a "conveyance direction." The direction that is orthogonal to the conveyance direction and a thickness direction of the sheet P is defined as a "main scanning direction" or a "width direction of the sheet P."

The internal tray 22 is a conveyance destination of the sheets P to be bound and serves as a placement tray on which the conveyed sheets P are stacked and placed. A plurality of sheets P sequentially conveyed on the second conveyance path Ph2 are temporarily placed on the internal tray 22. The end fence 23 stacks and places the conveyed sheets P, and aligns the positions of the sheets P or the position of the sheet bundle Pb placed on the internal tray 22 in the conveying direction. The side fences 24L and 24R align the position, in the main scanning direction, of the sheet P or the sheet bundle Pb placed on the internal tray 22. The edge binder 25 binds an end of the sheet bundle Pb aligned by the end fence 23 and the side fences 24L and 24R. Then, the conveyance roller pair 15 outputs the sheet bundle Pb subjected to the edge stitching to the output tray 26.

Now, a detailed description is given of the edge binder 25.

Figure 3:
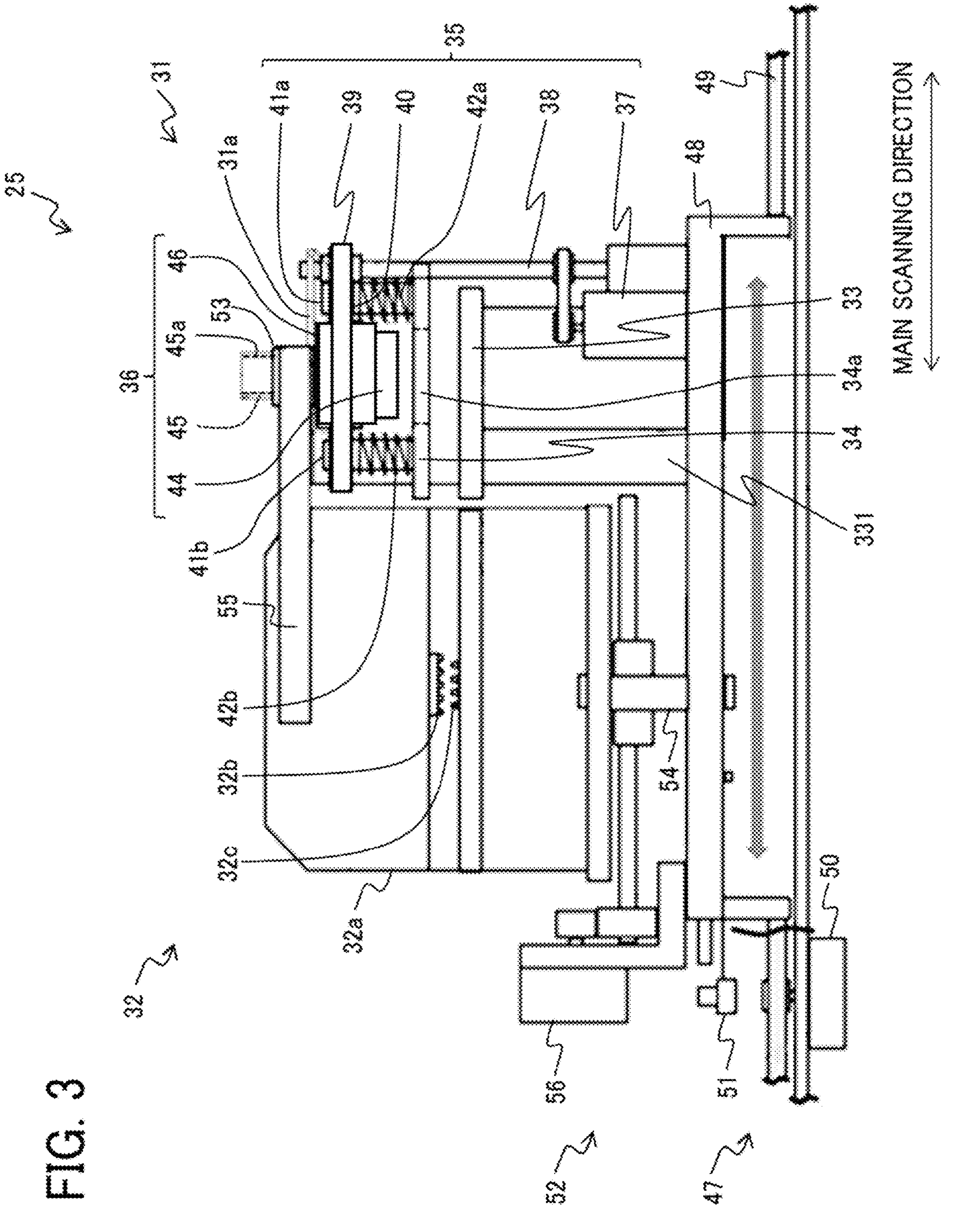
FIG. 3 is a schematic view of an upstream side of an edge binder of the post-processing apparatus of FIG. 2 in a conveyance direction.
Figure 4:
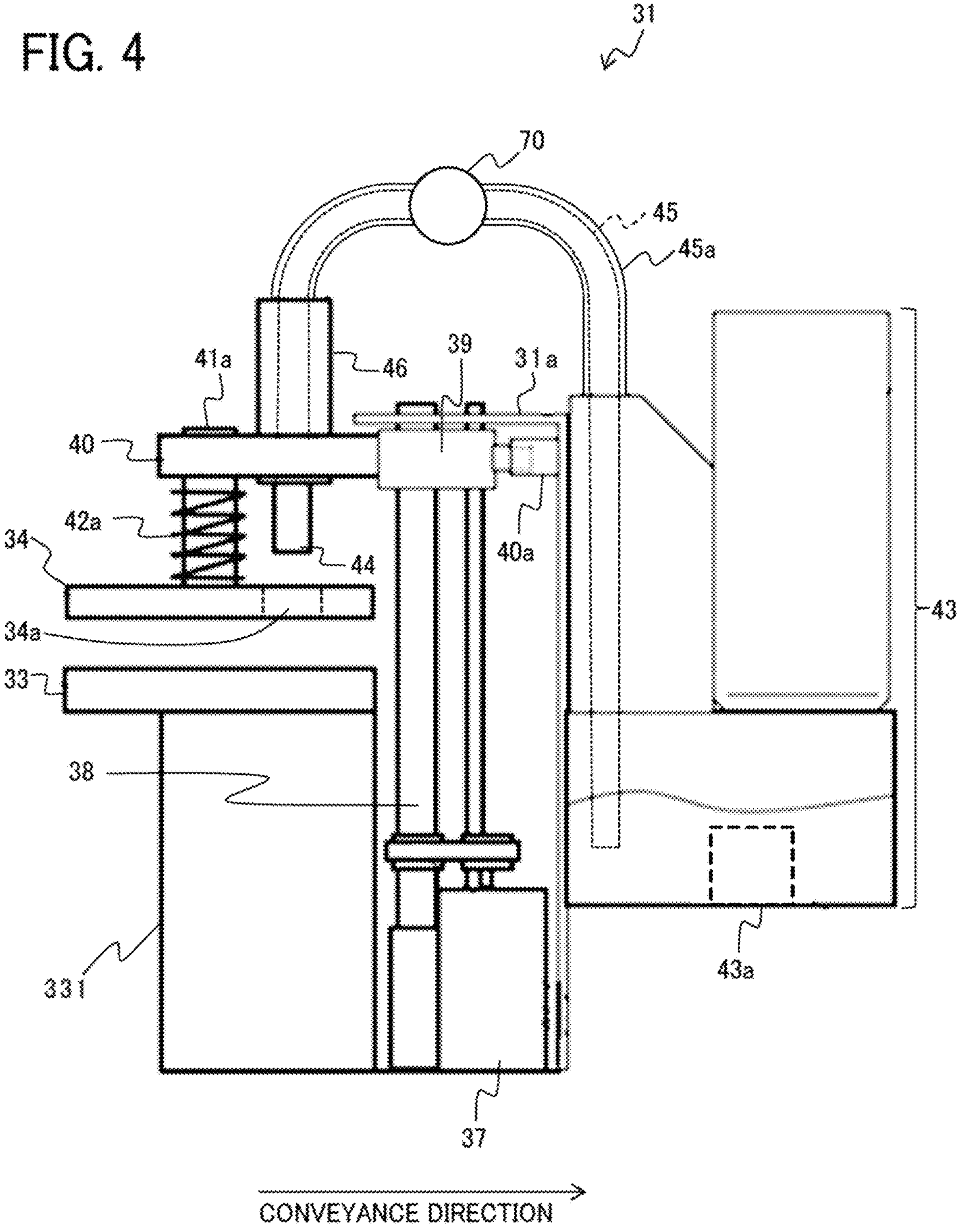
FIG. 4 is a schematic view of a liquid applier of the edge binder of FIG. 3 in a main scanning direction.

FIG. 3 is a schematic view of an upstream side of the edge binder 25 in the conveyance direction. FIG. 4 is a schematic view of a liquid applier 31 of the edge binder 25 in the main scanning direction. As illustrated in FIG. 3, the edge binder 25 includes the liquid applier 31 and a crimper 32 serving as a crimp binder. The liquid applier 31 and the crimper 32 are disposed downstream from the internal tray 22 in the conveyance direction and adjacent to each other in the main scanning direction.

The liquid applier 31 applies liquid (for example, water) that is stored in a liquid storage tank 43 to the sheet P or the sheet bundle Pb placed on the internal tray 22. In the following description, the application of liquid such as water to the sheet P or the sheet bundle Pb may be referred to as “liquid application” whereas a process to apply liquid may be referred to as a “liquid application process.”

More specifically, the liquid that is stored in the liquid storage tank 43 and used for the “liquid application” includes, as a main component, a liquid hydrogen-oxygen compound represented by the chemical formula $H_2O$. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in a liquid storage tank 43 may include an additive in addition to the main component. The liquid that is stored in the liquid storage tank 43 may include residual chlorine used as tap water. Preferably, for example, the liquid that is stored in the liquid storage tank 43 may include, as an additive, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used for the “liquid application.”

The water is not limited to the specific examples described above. The water may be water in a broad sense such as hypochlorous acid water or an ethanol aqueous solution diluted for disinfection. However, tap water may be used simply for the crimp binding because tap water is easy to obtain and store. A liquid including water as a main component as exemplified above enhances the binding strength of the sheet bundle Pb, as compared with a liquid of which the main component is not water.

As illustrated in FIGS. 3 and 4, the liquid applier 31 includes a lower pressure plate 33 serving as a receptacle for the sheet P or the sheet bundle Pb, an upper pressure plate 34, a liquid applier movement assembly 35, and a liquid application assembly 36. The components of the liquid applier 31 such as the lower pressure plate 33, the upper pressure plate 34, the liquid applier movement assembly 35, and the liquid application assembly 36 are held by a liquid application frame 31*a* and a base 48.

The lower pressure plate 33 and the upper pressure plate 34 are disposed downstream from the internal tray 22 in the conveyance direction. The lower pressure plate 33 supports, from below, the sheet P or the sheet bundle Pb placed on the internal tray 22. The lower pressure plate 33 is disposed on a lower-pressure-plate holder 331. The upper pressure plate 34 can move (up and down) in the thickness direction of the sheet P above the sheet P or the sheet bundle Pb placed on the internal tray 22. In other words, the lower pressure plate 33 and the upper pressure plate 34 are disposed to face each other in the thickness direction of the sheet bundle Pb with the sheet bundle Pb placed on the internal tray 22 and interposed between the lower pressure plate 33 and the upper pressure plate 34. In the following description, the thickness direction of the sheet bundle Pb may be referred to simply as “thickness direction.” The upper pressure plate 34 has a through hole 34*a* penetrating in the thickness direction at a position where the through hole 34*a* faces an end of a liquid application member 44 attached to a base plate 40.

The liquid applier movement assembly 35 moves the upper pressure plate 34, the base plate 40, and the liquid application member 44 in the thickness direction of the sheet P or the sheet bundle Pb. The liquid applier movement assembly 35 according to the present embodiment moves the upper pressure plate 34, the base plate 40, and the liquid application member 44 in conjunction with each other with a single liquid applier movement motor 37. The liquid applier movement assembly 35 includes, for example, the liquid applier movement motor 37, a trapezoidal screw 38, a nut 39, the base plate 40, columns 41*a* and 41*b*, and coil springs 42*a* and 42*b*.

The liquid applier movement motor 37 generates a driving force to move the upper pressure plate 34, the base plate 40, and the liquid application member 44. The trapezoidal screw 38 extends in a vertical direction in FIGS. 3 and 4 and is rotatably supported by the liquid application frame 31*a*. The trapezoidal screw 38 is coupled to an output shaft of the liquid applier movement motor 37 via, for example, a pulley and a belt. The nut 39 is screwed to the trapezoidal screw 38. The trapezoidal screw 38 is rotated by the driving force transmitted from the liquid applier movement motor 37. The rotation of the trapezoidal screw 38 moves the nut 39.

The base plate 40 is disposed above the upper pressure plate 34. The base plate 40 holds the liquid application member 44 with the end of the liquid application member 44 projecting downward. The base plate 40 is coupled to the trapezoidal screw 38 to move together with the trapezoidal screw 38. The position of the base plate 40 in the vertical direction is detected by a movement sensor 40*a* (see FIG. 10).

The columns 41*a* and 41*b* project downward from the base plate 40 around the end of the liquid application member 44. The columns 41*a* and 41*b* can move relative to the base plate 40 in the thickness direction. The columns 41*a* and 41*b* have respective lower ends holding the upper pressure plate 34. The columns 41*a* and 41*b* have respective upper ends provided with stoppers that prevent the columns 41*a* and 41*b* from being removed from the base plate 40. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* downward with respect to the base plate 40.

The liquid application assembly 36 applies liquid to the sheet P or the sheet bundle Pb at a predetermined liquid application position with respect to the sheet P or the sheet bundle Pb placed on the internal tray 22. Specifically, the liquid application assembly 36 brings the end of the liquid application member 44 into contact with the liquid application position of the sheet P or the sheet bundle Pb to apply the liquid to at least one sheet P of the sheet bundle Pb. The liquid application assembly 36 includes the liquid storage tank 43, the liquid application member 44, a supplier 45, and a joint 46.

The liquid storage tank 43 stores the liquid to be supplied to the sheet P or the sheet bundle Pb. The amount of liquid that is stored in the liquid storage tank 43 is detected by a liquid amount sensor 43*a*. The liquid application member 44 supplies the liquid stored in the liquid storage tank 43 to the sheet P or the sheet bundle Pb. The liquid application member 44 is held by the base plate 40 with the end of the liquid application member 44 facing downward. The liquid application member 44 is made of a material having a relatively high liquid absorption (for example, sponge or fiber).

The supplier 45 is an elongated member having a base end immersed in the liquid stored in the liquid storage tank 43 and another end coupled to the liquid application member 44. Like the liquid application member 44, for example, the supplier 45 is made of a material having a relatively high liquid absorption. Accordingly, the liquid absorbed from the base end of the supplier 45 is supplied to the liquid application member 44 by capillary action.

A protector 45*a* is an elongated cylindrical body (for example, a tube) that is fitted around the supplier 45. The protector 45*a* prevents the liquid absorbed by the supplier 45 from leaking or evaporating. Each of the supplier 45 and the protector 45*a* is made of a flexible material. The joint 46 fixes the liquid application member 44 to the base plate 40. Accordingly, the liquid application member 44 keeps projecting downward from the base plate 40 with the end of the liquid application member 44 facing downward when the liquid application member 44 is moved by the liquid applier movement assembly 35.

The crimper 32 presses and deforms the sheet bundle Pb with serrate binding tool 320 (e.g., the upper binding teeth 32*b* and the lower binding teeth 32*c*) to bind the sheet bundle Pb. In short, the crimper 32 binds the sheet bundle Pb without staples. The binding tool 320 including the binding teeth 32*b* serving as upper crimping teeth and the binding teeth 32*c* serving as lower crimping teeth, which are components of the crimper 32, are disposed on a crimping frame 32*a*. In the following description, the binding teeth 32*b* and the binding teeth 32*c* may be referred to as a pair of binding teeth 32*b* and 32*c*. In the following description, such a way of pressing and deforming a given position on the sheet bundle Pb to bind the sheet bundle Pb may be referred to as "crimp binding." In other words, the crimper 32 crimps and binds the sheet bundle Pb or performs the crimp binding on the sheet bundle Pb.

Figure 5:
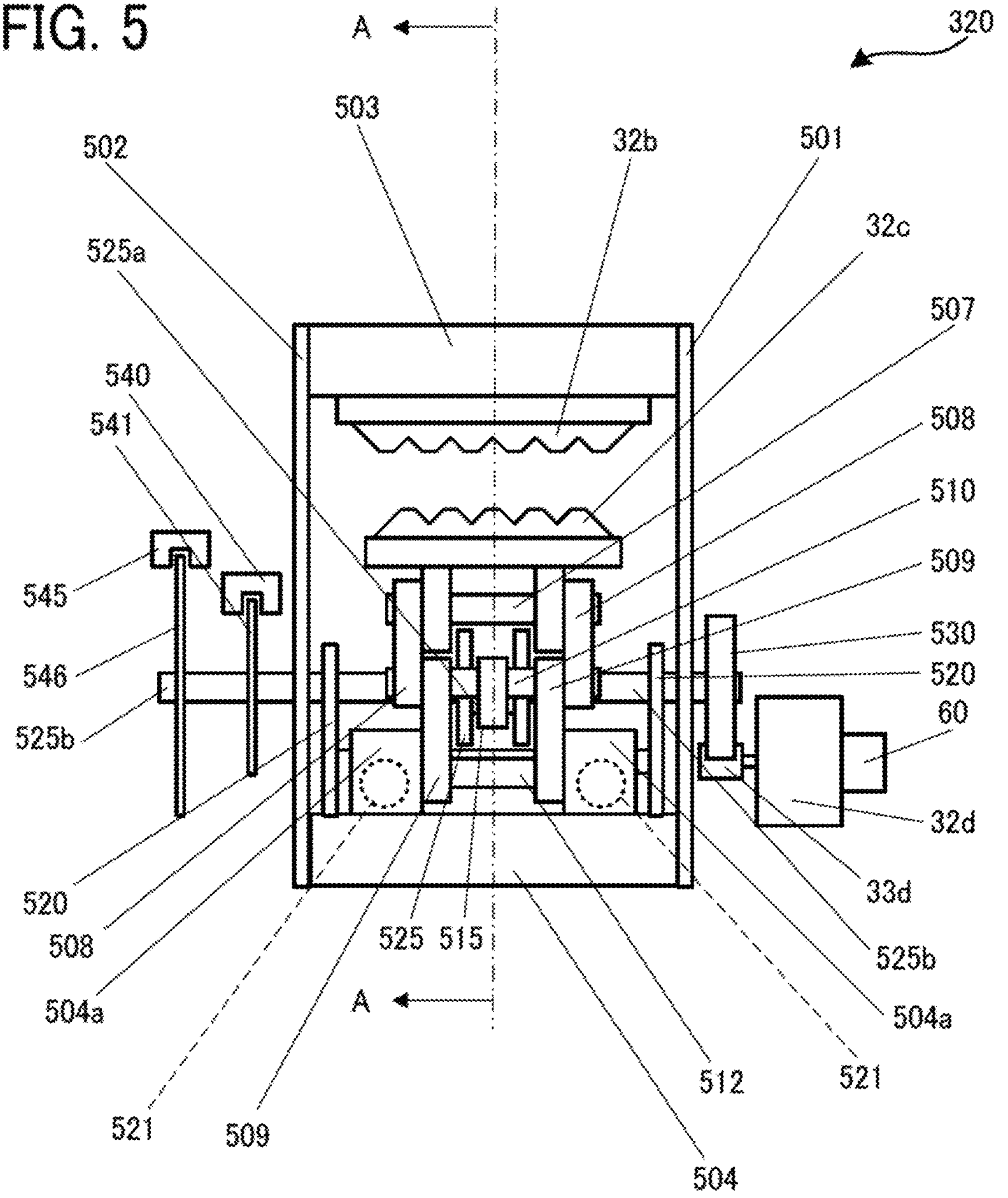
FIG. 5 is a side view of a binding tool in a crimper.
Figure 6:
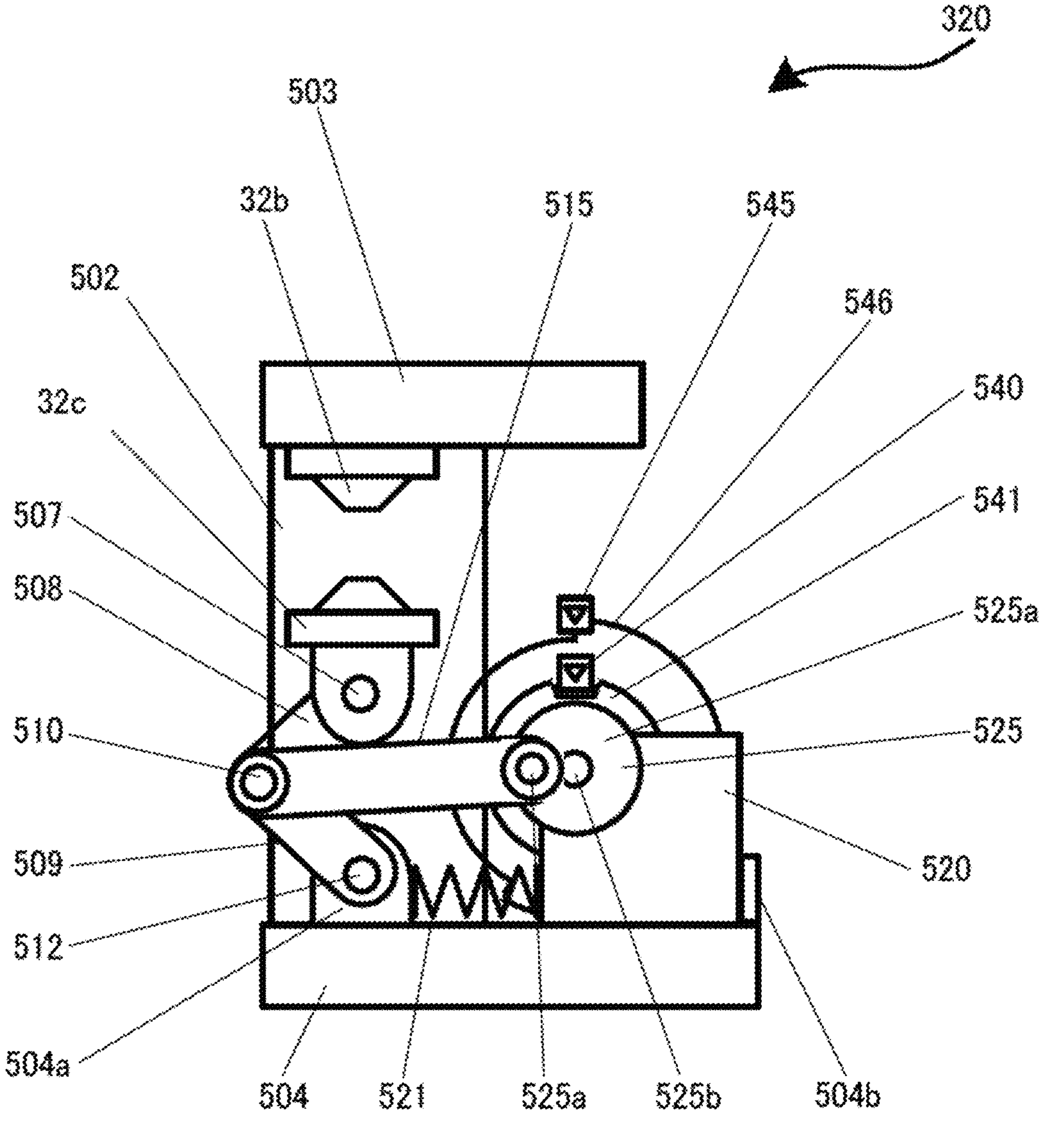
FIG. 6 is a front view of the binding tool in the crimper of FIG. 5.
Figure 7:
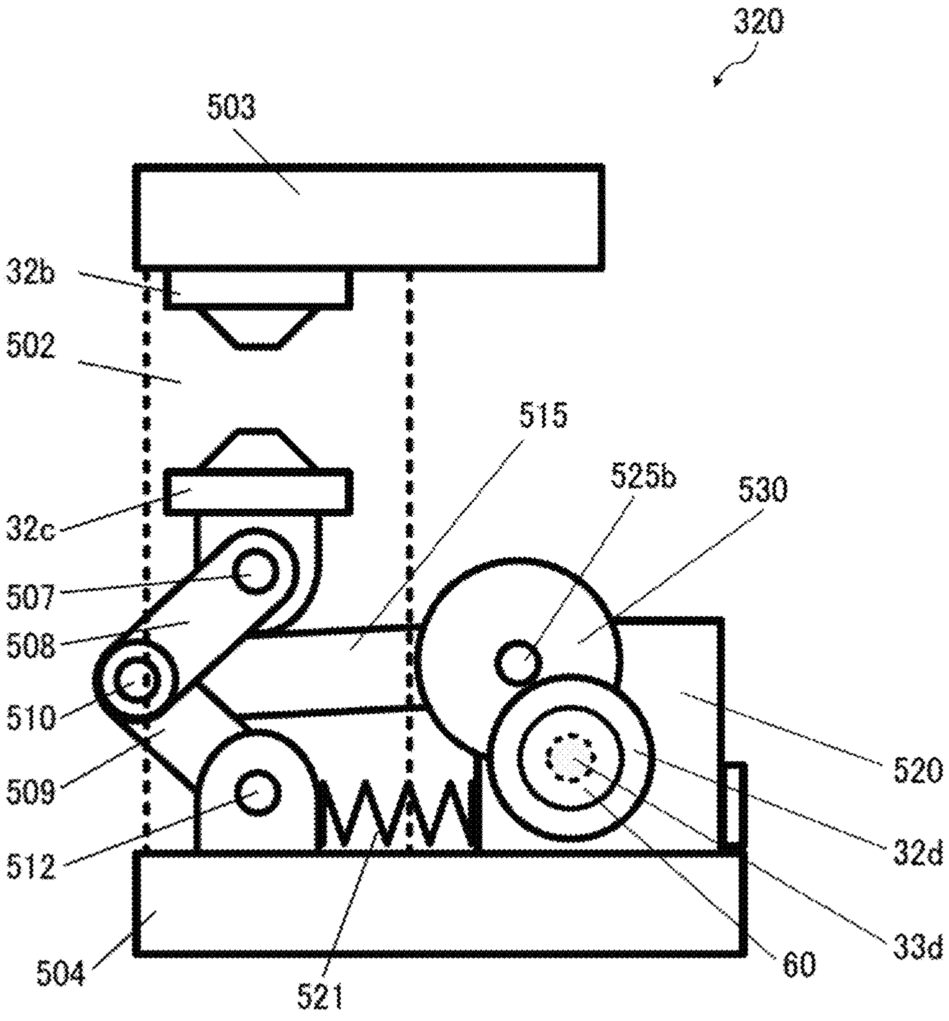
FIG. 7 is a front view of a driver of the binding tool in the crimper of FIG. 5.

Below, a description is given of a detailed configuration of the binding tool 320 described in the first embodiment. The configuration of the binding tool 320 is described with reference to FIGS. 5, 6, and 7. FIG. 5 is a side view of the binding tool 320. FIG. 6 is a front view of the binding tool 320, illustrating the internal structure thereof. FIG. 7 is a front view of the binding tool 320, illustrating a configuration for driving a crank 525. FIG. 5 is a side view of the binding tool 320. FIG. 6 is also a front view of the binding tool 320, illustrating the internal configuration of the binding tool 320 seen from the direction indicated by arrows A in FIG. 6. FIG. 7 is also a front view of the binding tool 320, illustrating a driver of the lower binding teeth 32*b* viewed from the side on which the contact-separation motor 32*d* is disposed in FIG. 5. In FIG. 7, a rear plate 502 is illustrated in a transparent state (broken lines) in order to clearly describe how the lower binding teeth 32*b* are driven by the contact-separation motor 32*d*.

The binding tool 320 has a housing including a front plate 501, a rear plate 502, an upper frame 503, and a lower frame 504. In the pair of binding teeth (the upper binding teeth 32*b* and the lower binding teeth 32*b*) that performs the crimping binding, the upper binding teeth 32*b* is fixed to the upper frame 503. On the other hand, the lower binding teeth 32*c* includes a rotation shaft 507 and an upper pressure link 508 rotatably attached to the rotation shaft 507. A lower frame support 504*a* is fixed to the upper surface of the lower frame 504. The lower frame support 504*a* includes a rotation shaft 512 and a lower pressure link 509 rotatably attached to the rotation shaft 512. The upper pressure link 508 and the lower pressure link 509 are connected to each other by a rotation shaft 510. That is, the lower binding teeth 32*c* are configured to be movable in the up-down direction by a link assembly including the upper pressure link 508, the rotation shaft 510, and the lower pressure link 509.

One end of a connecting member 515 is rotatably attached to the rotation shaft 510 of the link assembly. The other end of the connecting member 515 is rotatably attached to the rotation shaft 525*a* of the crank 525. The crank 525 is fixed to a crank rotation shaft 525*b*. The crank rotation shaft 525*b* is rotatably held by a pressing frame 520, thus allowing the crank 525 to rotate about the crank rotation shaft 525*b*. As illustrated in FIGS. 5 and 7, a driving force transmission gear 530 is fixed to one end of the crank rotation shaft 525*b*, and the driving force transmission gear 530 is engaged with an output gear 33*d* of the contact-separation motor 32*d*.

When the contact-separation motor 32*d* is driven, the driving force is transmitted to the crank rotation shaft 525*b* via the driving force transmission gear 530. As a result, the crank 525 rotates counterclockwise in FIG. 6. Then, the connecting member 515 coupled to the rotation shaft 525*a* moves toward the left side in FIG. 6 in conjunction with the rotation of the crank 525. When the connecting member 515 moves toward the left side in FIG. 6, the rotation shaft 510 connecting the upper pressure link 508 and the lower pressure link 509 also moves toward the left side in FIG. 6. As a result, the link assembly extends, and the lower binding teeth 32*c* move toward the upper binding teeth 32*b*.

As described above, when the crank 525 rotates in the specified direction, the pair of crimping members (i.e., the upper binding teeth 32*b* and the lower binding teeth 32*c*) can repeat the separation state and the pressing state. Accordingly, the pair of crimping members can press and deform the sheet bundle Pb to bind the sheet bundle Pb.

A home position shutter 541 and a crank position shutter 546 that rotate in conjunction with the rotation of the crank 525 are fixed to the other end of the crank rotation shaft 525*b*. A home position sensor 540 and a crank position sensor 545 are arranged for the home position shutter 541 and the crank position shutter 546, respectively. The controller 100 (see FIG. 10) receives detection signals from the home position sensor 540 and the crank position sensor 545 and controls the rotation of the contact-separation motor 32*d* in accordance with the detection signals.

The crank position sensor 545 includes a light emitter that irradiates infrared light and a light receiver that receives the infrared light.

The crank position shutter 546 is a circular member that rotates in the same direction as the crank 525 and has a step on its outer periphery (see FIG. 6), and has two sections: a section with a higher step (a section with a longer radius from the center of the circle) and a section with a lower step (a section with a shorter radius from the center of the circle (specified range)).

The light emitter and the light receiver of the crank position sensor 545 face each other across the crank position shutter 546.

When the crank position shutter 546 rotates to bring the section with the higher step to a position between the light emitter and the light receiver, the light emission is blocked and the detection signal of the crank position sensor 545 is turned off.

By contrast, when the section with the lower step comes between the light emitter and the light receiver, the infrared light passes through and reaches the light receiver, and the detection signal of the crank position sensor 545 is turned on.

The home position shutter 541 and the home position sensor 540 have the same configuration as the configuration of the crank position shutter 546 and the crank position sensor 545.

The pressing frame 520 is slidably attached to the upper surface of the lower frame 504. The lower frame support 504*a* is fixed on the upper surface of the lower frame 504. A pressing spring 521 is disposed between the lower frame support 504*a* and the pressing frame 520, to press the pressing frame 520 in a direction from the lower frame support 504*a* toward a stopper 504*b*.

The stopper 504*b* is fixed on the opposite side of the pressing spring 521 across the pressing frame 520, to restrict the moving range of the pressing frame 520.

As illustrated in FIG. 5, a binding load sensor 60 is disposed as a binding load detector to detect the magnitude of a load applied to the binding tool 320 when the binding tool 320 performs the binding operation. The binding load sensor 60 detects a load applied to the contact-separation motor 32*d* when the binding tool 320 applies pressing deformation to the sheet bundle Pb. That is, the detection result of the binding load sensor 60 changes depending on the thickness of the sheet bundle Pb and the conditions of liquid application to the sheet P or the sheet bundle Pb.

Now, a description is given of the configuration of the crimper 32.

Figure 8A:
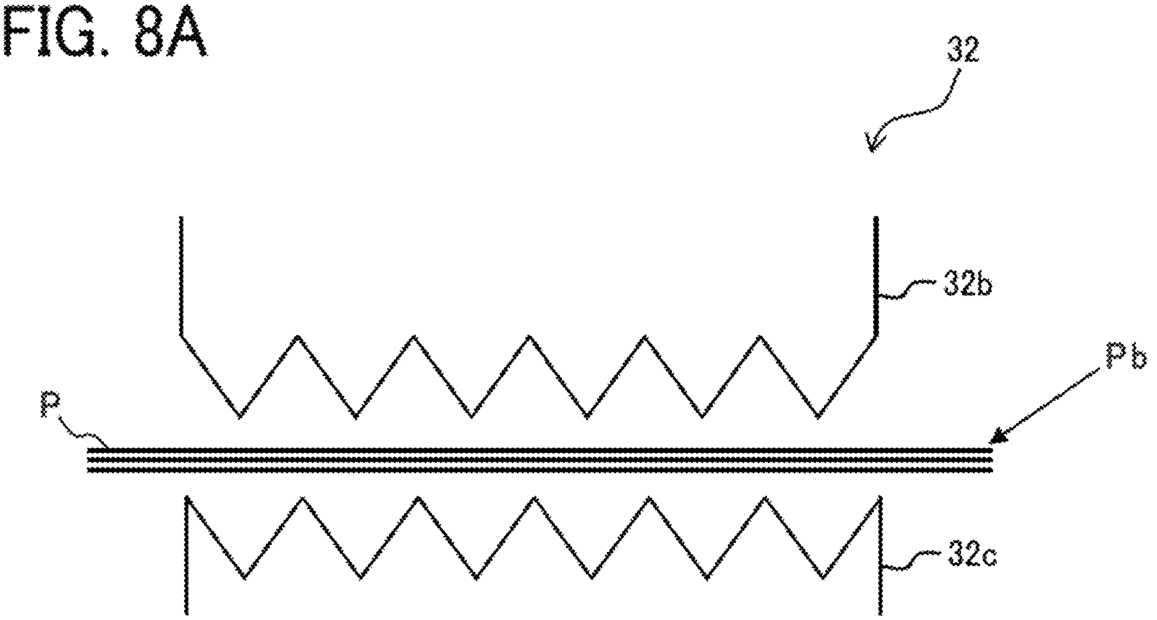
FIGS. 8A and 8B are schematic diagrams illustrating a configuration of a crimper of the post-processing apparatus of FIG. 2.
Figure 8B:
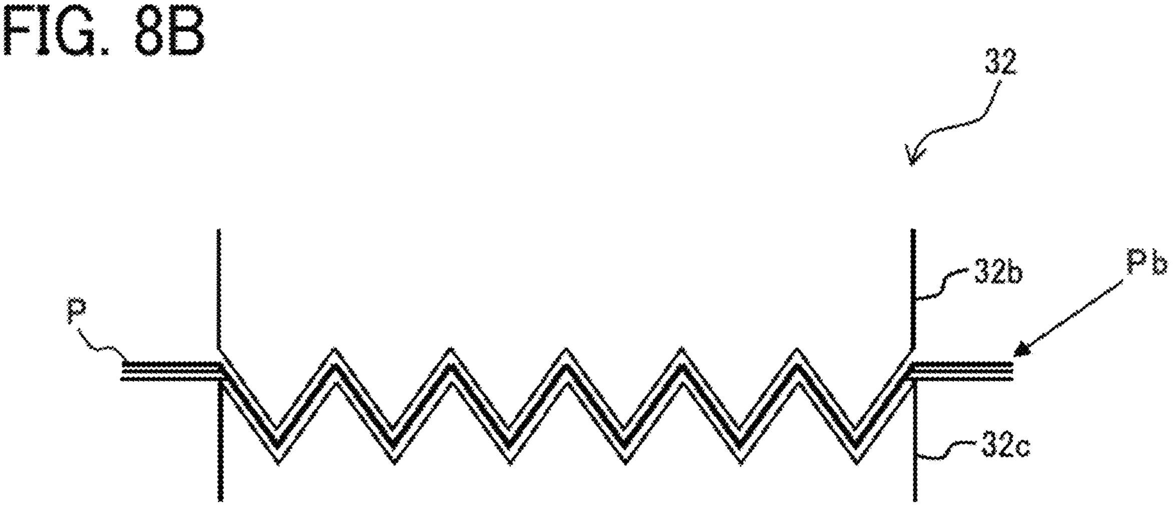

FIGS. 8A and 8B are schematic diagrams illustrating the configuration of the crimper 32. As illustrated in FIGS. 8A and 8B, the crimper 32 includes the binding tool 320 that is a pair of binding teeth (the upper binding teeth 32*b* and the lower binding teeth 32*b*). The binding teeth 32*b* and the binding teeth 32*c* are disposed to face each other in the thickness direction of the sheet bundle Pb with the sheet bundle Pb placed on the internal tray 22 and interposed between the binding teeth 32*b* and the binding teeth 32*c*. The binding teeth 32*b* and the binding teeth 32*c* have respective serrate faces facing each other. The serrate face of each of the binding teeth 32*b* and the binding teeth 32*c* includes concave portions and convex portions alternately formed. The concave portions and the convex portions of the binding teeth 32*b* are shifted from those of the binding teeth 32*c* such that the binding teeth 32*b* are engaged with the binding teeth 32*c*. The binding teeth 32*b* and the binding teeth 32*c* are brought into contact with and separated from each other by a driving force of a contact-separation motor 32*d* illustrated in FIG. 10.

In a process of supplying a plurality of sheets P of a sheet bundle Pb to the internal tray 22, the pair of binding teeth (the upper binding teeth 32*b* and the lower binding teeth 32*b*) are apart from each other as illustrated in FIG. 8A. When all the sheets P of the sheet bundle Pb are placed on the internal tray 22, the pair of binding teeth (the binding teeth 32*b* and the binding teeth 32*c*) are engaged with each other to press and deform the sheet bundle Pb in the thickness direction as illustrated in FIG. 8B. As a result, the sheet bundle Pb that has been placed on the internal tray 22 is crimped and bound. The sheet bundle Pb thus crimped and bound is output to the output tray 26 by the conveyance roller pair 15.

The configuration of the crimper 32 is not limited to any particular configuration and may be any configuration as long as the pair of binding teeth such as the binding teeth 32*b* and the binding teeth 32*c* of the crimping assembly can engage with each other. As in the present embodiment described above, the crimping assembly may employ a link assembly system that performs the crimping and separating operations of the pair of upper binding teeth 32*b* and lower binding teeth 32*c* with a driving source that rotates only forward or rotates forward and in reverse and a link mechanism. Alternatively, the crimping assembly may employ a linear motion system to linearly bring the crimping and separating operations of the pair of the binding teeth 32*b* and the binding teeth 32*c* with a screw assembly that converts the rotational motion of a driving source into linear motion.

As illustrated in FIG. 3, the edge binder 25 includes an edge binder movement assembly 47. The edge binder movement assembly 47 moves the edge binder 25, specifically, the liquid applier 31 and the crimper 32, in the main scanning direction along a downstream end in the conveyance direction of the sheet P placed on the internal tray 22. The edge binder movement assembly 47 includes, for example, the base 48, a guide shaft 49, an edge binder movement motor 50, and a position sensor 51.

The liquid applier 31 and the crimper 32 are attached to the base 48 in the state in which the liquid applier 31 and the crimper 32 are adjacent to each other in the main scanning direction. The guide shaft 49 extends in the main scanning direction at a position downstream from the internal tray 22 in the conveyance direction. The guide shaft 49 supports the base 48 slidably in the main scanning direction. The edge binder movement motor 50 generates a driving force to move the edge binder 25. The driving force of the edge binder movement motor 50 is transmitted to the base 48 via a pulley and a timing belt.

As a result, the liquid applier 31 and the crimper 32 integrated by the base 48 slide in the main scanning direction along the guide shaft 49. The positions of the liquid applier 31 and the crimper 32 may be ascertained with, for example, an encoder sensor attached to an output shaft of the edge binder movement motor 50. The position sensor 51 detects the arrival of the edge binder 25 at a standby position HP illustrated in FIG. 9A.

As illustrated in FIG. 3, the edge binder 25 includes a pivot assembly 52. The pivot assembly 52 pivots each of the pair of upper binding teeth 32*b* and lower binding teeth 32*c* and the liquid application member 44 about a crimper pivot 54 extending in the thickness direction of the sheet P or the sheet bundle Pb placed on the internal tray 22. The thickness direction of the sheet P of the sheet bundle Pb is the direction orthogonal to the conveyance direction and to the main scanning direction. The pivot assembly 52 includes a liquid applier pivot 53, the crimper pivot 54, a coupling assembly 55, and a pivot motor 56 serving as a driving source.

The liquid applier pivot 53 and the crimper pivot 54 extend in the thickness direction of the sheet P or the sheet bundle Pb placed on the internal tray 22. In other words, the liquid applier pivot 53 and the crimper pivot 54 extend parallel to each other at positions apart from each other in the main scanning direction. The liquid applier pivot 53 supports the liquid application member 44 pivotably with respect to the liquid application frame 31*a*. The crimper pivot 54 supports the crimping frame 32*a* pivotably with respect to the base 48. The coupling assembly 55 couples the crimping frame 32*a* and the liquid applier pivot 53 to each other.

The pivot motor 56 generates a driving force to pivot the pair of upper binding teeth 32*b* and lower binding teeth 32*c* and the liquid application member 44. The driving force of the pivot motor 56 is transmitted to the crimper pivot 54 via a pulley and a timing belt. As a result, the crimping frame 32*a* pivots about the crimper pivot 54 together with the pair of upper binding teeth 32*b* and lower binding teeth 32*c*. The rotation of the crimping frame 32*a* is transmitted to the liquid applier pivot 53 via the coupling assembly 55. As a result, the liquid application member 44 is pivoted about the liquid applier pivot 53 with respect to the liquid application frame 31*a*.

Now, a description is given of the movement of the edge binder 25 in the main scanning direction.

Figure 9C:
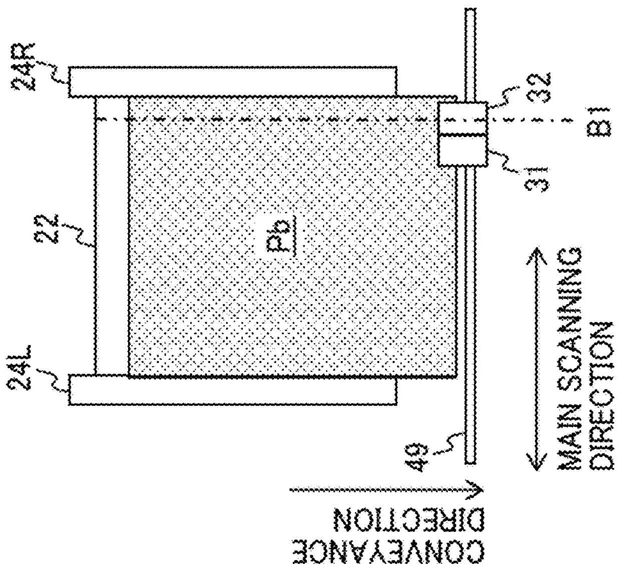
FIGS. 9A, 9B, and 9C are diagrams illustrating the positions of the liquid applier and the crimper during a binding process.
Figure 9B:
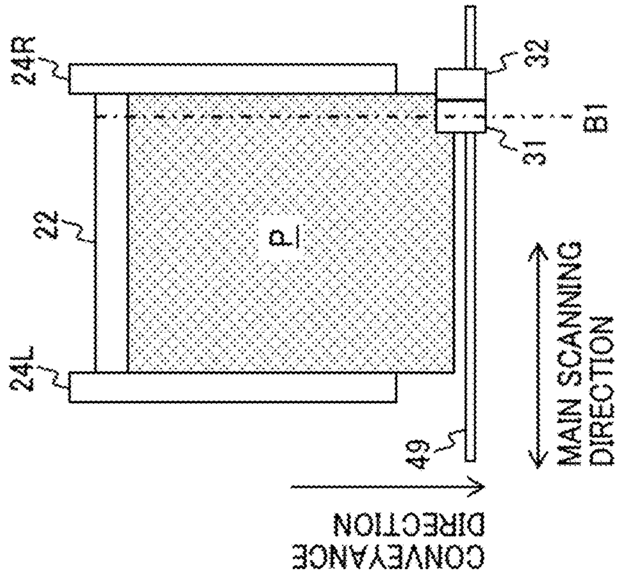
Figure 9A:
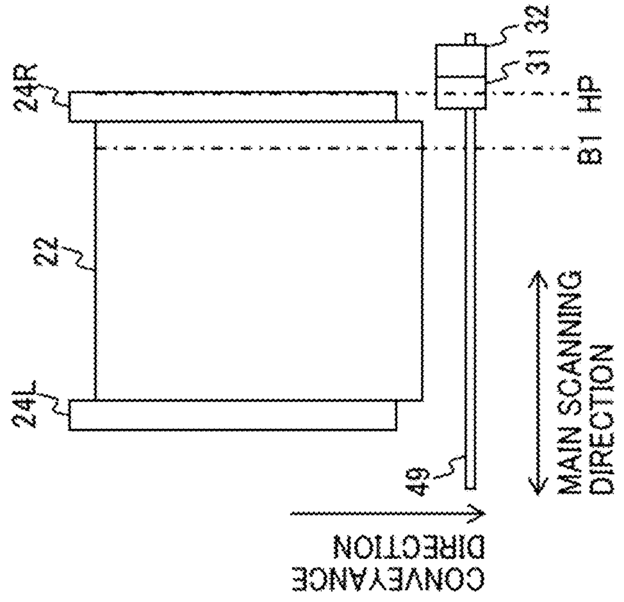

Specifically, with reference to FIGS. 9A to 9C, a description is now given of a moving mode, in the main scanning direction, of the liquid applier 31 and the crimper 32 integrated by the base 48. As illustrated in FIG. 9A, the standby position HP is away in the width direction from the sheet P or the sheet bundle Pb placed on the internal tray 22. As illustrated in FIGS. 9B and 9C, the liquid applier 31 and the crimper 32 are moved to a binding position B1 by the edge binder movement assembly 47. At the binding position B1, the liquid applier 31 faces the sheet P or the sheet bundle Pb placed on the internal tray 22 to perform the liquid application whereas the crimper 32 faces the sheet P or the sheet bundle Pb placed on the internal tray 22 to perform the crimp binding. In other words, the standby position HP and the binding position B1 are apart from each other in the main scanning direction. The liquid applier 31 according to the present embodiment is adjacent to the crimper 32 and closer to the binding position B1 than the crimper 32 at the standby position HP.

The liquid applier 31 can be moved in the main scanning direction together with the crimper 32 by a driving force transmitted from the edge binder movement motor 50. A liquid application position to which the liquid is applied on the sheet P or the sheet bundle Pb by the liquid applier 31 corresponds to the binding position to be crimped and bound by the crimper 32. For this reason, in the following description, the liquid application position and the binding position are denoted by the same reference numeral.

Referring back to FIG. 2, the post-processing apparatus 3 further includes an end fence 27, a saddle binder 28, a sheet folding blade 29, and the output tray 30. The end fence 27, the saddle binder 28, and the sheet folding blade 29 perform the saddle stitching on the sheet bundle Pb constructed of the sheets P that are conveyed through the third conveyance passage Ph3. Among the sheets P supplied from the image forming apparatus 2, the sheet bundle Pb subjected to the saddle stitching is output to the output tray 30.

The end fence 27 aligns the positions of the sheets P that are sequentially conveyed through the third conveyance passage Ph3, in a direction in which the sheets P are conveyed. The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position and causes the conveyance roller pair 18 to sandwich the sheet bundle Pb. The conveyance roller pairs 18 and 19 output the sheet bundle Pb subjected to the saddle stitching to the output tray 30.

Now, a description is given of a hardware control configuration of the post-processing apparatus 3.

Figure 10:
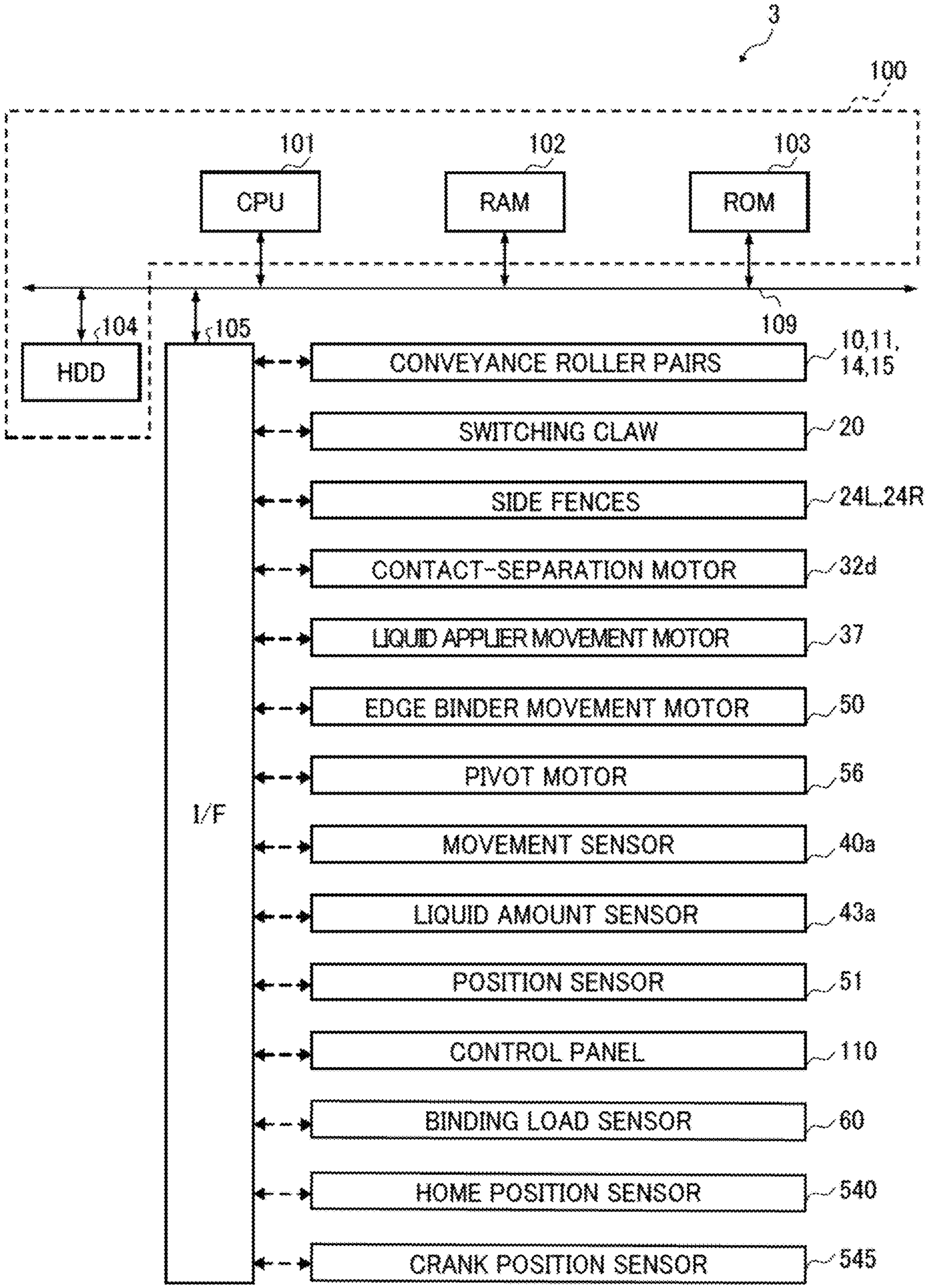
FIG. 10 is a block diagram illustrating a hardware configuration of the post-processing apparatus of FIG. 2 to control the operation of the post-processing apparatus.

FIG. 10 is a diagram illustrating a hardware configuration of the post-processing apparatus 3 in the control configuration of the post-processing apparatus 3 according to the first embodiment of the present disclosure. As illustrated in FIG. 10, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects the conveyance roller pairs 10, 11, 14, and 15, the switching claw 20, the side fences 24L and 24R, the contact-separation motor 32*d*, the liquid applier movement motor 37, the edge binder movement motor 50, the pivot motor 56, the movement sensor 40*a*, the liquid amount sensor 43*a*, the position sensor 51, a control panel 110, the binding load sensor 60, the home position sensor 540, and the crank position sensor 545 to the common bus 109. The controller 100 operates, via the I/F 105, the conveyance roller pairs 10, 11, 14, and 15, the switching claw 20, the side fences 24L and 24R, the contact-separation motor 32*d*, the liquid applier movement motor 37, the edge binder movement motor 50, and the pivot motor 56 to acquire detection results of the movement sensor 40*a*, the liquid amount sensor 43*a*, the position sensor 51, the binding load sensor 60, the home position sensor 540, and the crank position sensor 545. Although FIG. 10 illustrates the components that execute the edge stitching process, the components that execute the saddle stitching process are also similarly controlled by the controller 100.

As illustrated in FIG. 1, the image forming apparatus 2 includes the control panel 110. The control panel 110 includes an operation unit that receives instructions from a user and a display serving as a notifier that notifies the user of information. The operation unit includes, for example, hard keys and a touch screen overlaid on a display. The control panel 110 acquires information from the user through the operation unit and provides information to the user through the display. Note that a specific example of the notifier is not limited to the display and may be a light emitting diode (LED) lamp or a speaker. The post-processing apparatus 3 may include the control panel 110 like the control panel 110 described above.

The controller 100 operates the contact-separation motor 32*d* to nip an end of the sheet bundle Pb between the pair of binding teeth (the upper binding teeth 32*b* and the lower binding teeth 32*c*) of the binding tool 320 and press and deform the end of the sheet bundle Pb. In this operation (binding operation), even if the contact-separation motor 32*d* is controlled to apply a predetermined operation amount to the binding tool 320, the state in which the binding tool 320 bites into the sheets P may vary depending on the liquid applied state of the sheet bundle Pb. When the biting state reaches a predetermined amount, it can be regarded that a predetermined binding strength is obtained. However, when the biting state does not reach the predetermined amount, the binding strength does not reach the predetermined strength, which causes insufficient stability of the binding state.

For this reason, the controller 100 detects, with the binding load sensor 60, the operation amount of binding of the binding tool 320 in executing the binding operation, and determines the crimp binding load based on the detection result. The binding load sensor 60 detects, for example, an operation state of the contact-separation motor 32*d*. If the contact-separation motor 32*d* is a stepping motor, the controller 100 detects, with the binding load sensor 60, an operation amount (displacement amount) of the binding tool 320 when a predetermined drive pulse is applied. If the detection result does not reach a predetermined amount, it can be determined that the load is high. Alternatively, a threshold value for determining whether the predetermined ratio is exceeded may be set in advance by comparison with the predetermined amount. In such a case, when the threshold value is not exceeded, the controller 100 determines that the load is high. Note that a plurality of thresholds may be set for determining whether the predetermined ratio is exceeded.

Now, a description is given of a flowchart of the crimp binding process.

Figure 11:
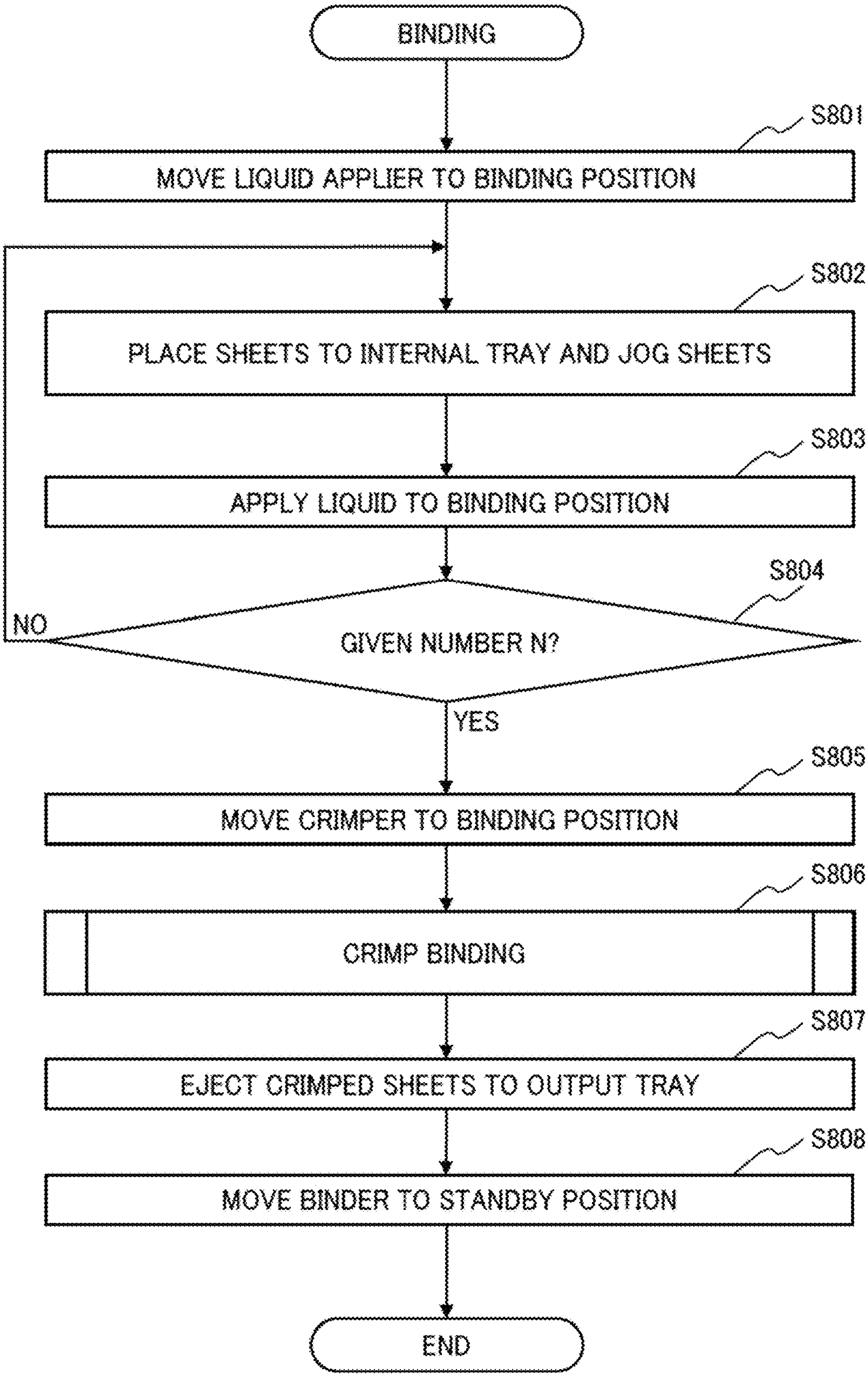
FIG. 11 is a flowchart of a binding process.

FIG. 11 is a flowchart of a binding process implemented by control processing executed by the controller 100. The controller 100 starts the binding process illustrated in FIG. 11, for example, when the controller 100 acquires an instruction to execute the binding process from the image forming apparatus 2. Hereinafter, the instruction to execute the binding process may be referred to as a "binding command."

The binding command includes, for example, the number of sheets P of the sheet bundle Pb, the number of sheet bundles Pb to be bound, the binding position on the sheet bundle Pb, and a binding posture of the edge binder 25. In the following description, the number of sheets P of the sheet bundle Pb may be referred to as "given number of sheets" or "given number N" whereas the number of sheet bundles Pb to be bound may be referred to as "requested number of copies." The liquid applier 31 and the crimper 32 are at the standby position HP at the start of the binding process. As described above, the standby position HP is away in the width direction from the sheet P placed on the internal tray 22 as illustrated in FIG. 9A.

In step S801, as illustrated in FIG. 9B, the controller 100 drives the edge binder movement motor 50 to move the edge binder 25 in the main scanning direction so that the liquid applier 31 faces the binding position B1 (in other words, the liquid applied position B1).

Next, in step S802, the controller 100 rotates the conveyance roller pairs 10, 11, 14, and 15 to accommodate the sheet P on which an image is formed by the image forming apparatus 2 in the internal tray 22. In addition, the controller 100 moves the side fences 24L and 24R to align the position of the sheet bundle Pb placed on the internal tray 22 in the main scanning direction. In short, the controller 100 performs so-called jogging.

Subsequently, in step S803, the controller 100 executes the liquid application operation on the binding position B1 of the sheet P placed on the internal tray 22 in the immediately preceding step S802 based on the liquid application control data adjusted in advance. The adjustment of the liquid application control data is determined in advance by a binding process (step S806, which will be described in detail below). In other words, the controller 100 controls the driving of the liquid applier movement motor 37, based on the adjusted liquid application control data, to cause the liquid application member 44 to contact the binding position B1 on the sheet P placed on the internal tray 22.

In step S804, the controller 100 determines whether the number of sheets P accommodated in the internal tray 22 has reached the given number N of sheets indicated by the binding command. When the controller 100 determines that the number of sheets P accommodated in the internal tray 22 has not reached the given number N of sheets (NO in step S804), the controller 100 executes the operations of steps S802 to S804 again.

In other words, the controller 100 executes the operations of steps S802 to S804 each time the sheet P is conveyed to the internal tray 22 by the conveyance roller pairs 10, 11, 14, and 15. Note that the liquid may be applied to some sheets P or all the sheets P of the sheet bundle Pb. For example, the controller 100 may cause the liquid applier 31 to apply the liquid to the binding position B1 at intervals of one in every "n" sheets. Note that "n" is less than "N" (i.e., n<N).

By contrast, when the controller 100 determines that the number of sheets P that are stored in the internal tray 22 has reached the given number N (YES in step S804), in step S805, the controller 100 drives the edge binder movement motor 50 to cause the edge binder to move in the main scanning direction so that the crimper 32 faces the binding position B1 as illustrated in FIG. 9C.

Next, in step S806, the controller 100 crimps and binds the sheet bundle Pb accommodated in the internal tray 22. The details of the crimp binding will be described below. In step S807, the controller 100 causes the sheet bundle Pb subjected to the crimp binding to be ejected to the output tray 26. Specifically, the controller 100 drives the contact-separation motor 32*d* to cause the binding tool 320 (the pair of upper binding teeth 32*b* and lower binding teeth 32*b*) to sandwich the binding position B1 on the sheet bundle Pb placed on the internal tray 22. The controller 100 then rotates the conveyance roller pair 15 to output the sheet bundle Pb thus crimped and bound to the output tray 26.

Subsequently, in step S808, the controller 100 drives the edge binder movement motor 50 to move the edge binder 25 to the standby position HP.

The sheets that are placed on the internal tray 22 have a crimping area sandwiched by the pair of upper binding teeth 32*b* and lower binding teeth 32*b* in step S806. The crimping area overlaps a liquid application area contacted by an end face of the liquid application member 44 in step S803. In other words, the crimper 32 crimps and binds an inside of an area to which the liquid is applied by the liquid applier 31 on the sheet P placed on the internal tray 22.

Figure 12:
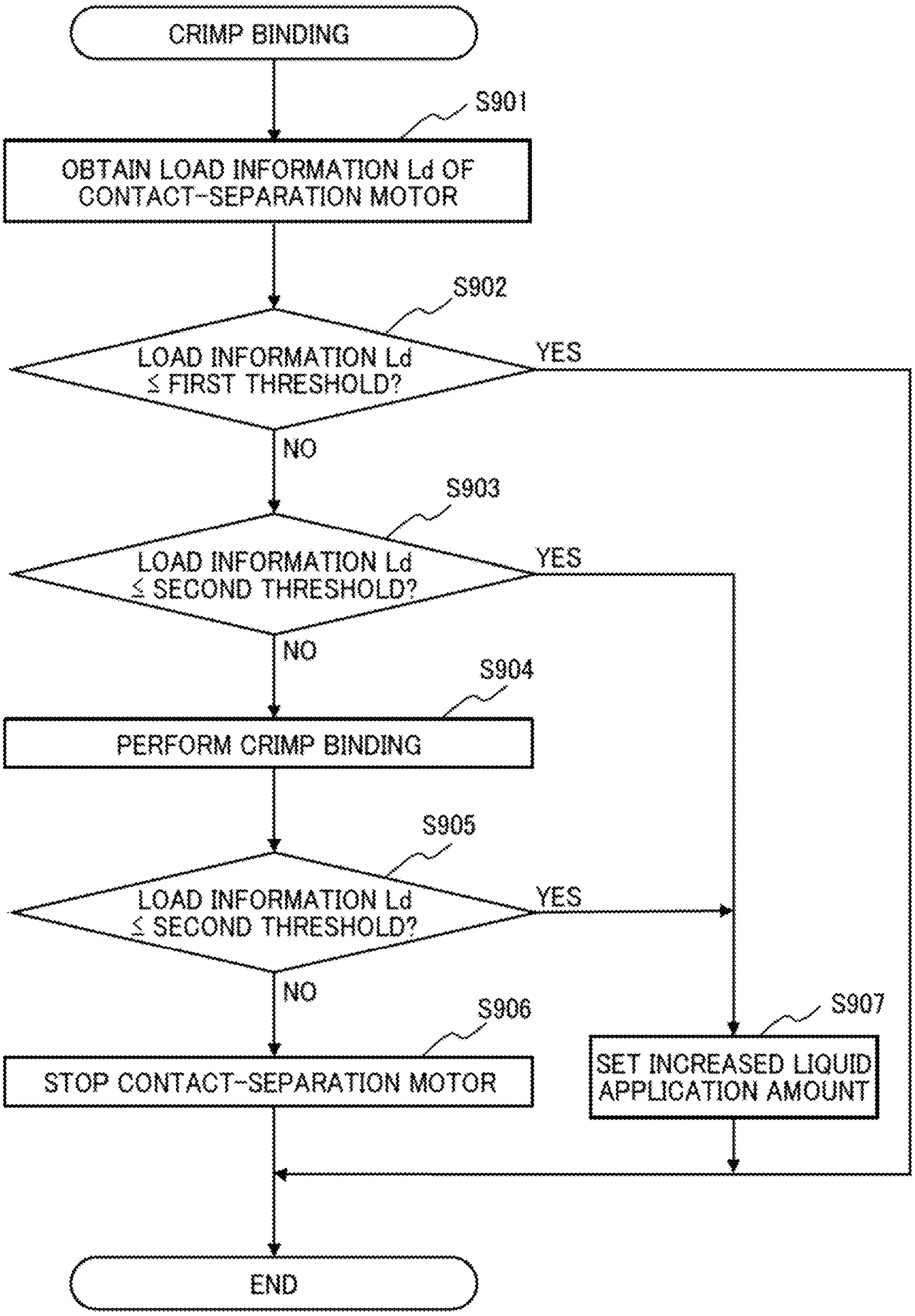
FIG. 12 is a flowchart of a crimp binding process.

Next, a detailed process of the crimp binding (in step S806) according to the present embodiment is described with reference to a flowchart of FIG. 12. Specifically, the controller 100 drives the contact-separation motor 32*d* to cause the binding tool 320 (the pair of upper binding teeth 32*b* and lower binding teeth 32*b*) to press and deform the binding position B1 on the sheet bundle Pb placed on the internal tray 22. At the same time, in step S901, the controller 100 acquires the detection result of the binding load sensor 60. The detection result of the binding load sensor 60 is referred to as "load information Ld".

The load information Ld is data indicating an operation amount of the binding tool 320 when a driving force of a preset value is applied to the contact-separation motor 32*df* to operate the binding tool 320. The load information Ld is also data proportional to the driving force, such as a voltage value or a current value applied to the contact-separation motor 32*d*, an operation speed of the binding tool 320, or a position of the binding tool 320 when the binding tool 320 reaches a predetermined operation amount. Therefore, the load information Ld is also data indicating a torque change of the contact-separation motor 32*d*.

Subsequently, in step S902, the controller 100 performs determination processing to determine whether the acquired load information Ld is equal to or less than a first predetermined value. If the value indicated by the load information Ld is equal to or less than the first threshold value (YES in step S902), it is considered that sufficient binding strength can be obtained even when the operation of the contact-separation motor 32*d* is based on the preset value. In this case, the controller 100 terminates the process without increasing the liquid application amount in the liquid application operation performed before the binding operation.

If the value indicated by the load information Ld is greater than the first threshold value (NO in step S902), in step S903, the controller 100 determines whether the value is equal to or less than a predetermined second threshold value. The second threshold value is greater than the first threshold value (first threshold value<second threshold value). If the value indicated by the load information Ld is equal to or less than the second threshold value (YES in step S903), it is considered that sufficient binding strength cannot be obtained when the operation of the contact-separation motor 32*d* is based on the preset value. In this case, the binding strength can be enhanced by increasing the amount of liquid applied to the sheet P in the liquid application operation. For this reason, the controller 100 controls the liquid applier movement motor 37 to increase the amount or time (i.e., the amount of liquid to be applied) by which the liquid application member 44 is brought into contact with the sheet P in the next liquid application. Thus, in step S907, the controller 100 increases the amount of liquid to be applied to the sheet P by the liquid application member 44.

If the value indicated by the load information Ld is greater than the second threshold value (NO in step S903), the value corresponds to a load equal to or greater than the upper limit of the specifications of the contact-separation motor 32*d*. In this case, processing is performed on the sheet bundle Pb to be bound so that the sheet bundle Pb is easily deformed under pressure. First, in step S904, the controller 100 operates the contact-separation motor 32*d* again to execute rebinding.

In the rebinding, in step S905, the controller 100 acquires the load information Ld again and determines whether the value indicated by the reacquired load information Ld is equal to or less than the second threshold value. When the value indicated by the reacquired load information Ld is equal to or less than the second threshold value (YES in step S905), the controller 100 controls the liquid applier movement motor 37 to increase the amount or time by which the liquid application member 44 is brought into contact with the sheet P in the next liquid application. Thus, in step S907, the controller 100 increases the amount of liquid to be applied to the sheet P by the liquid application member 44.

If the value indicated by the reacquired load information Ld is greater than the second threshold value (NO in step S905), the load corresponds to a load equal to or more than the upper limit of the specifications of the contact-separation motor 32*d*. For this reason, the controller 100 stops the operation of the contact-separation motor 32*d* and terminates the crimp binding process.

According to the above-described embodiment, for example, the following operational effects can be achieved.

In the crimp binding executed in the post-processing apparatus 3, an operation state of the contact-separation motor 32*d* serving as a driving source of the binding tool 320 is detected, and the controller 100 determines the suitability of a detection result using a plurality of thresholds. As a result, appropriate liquid application can be performed on the sheet P in accordance with the magnitude of the load when the sheet bundle Pb is pressed and deformed.

In addition, since a plurality of threshold values are used to determine the operation state of the contact-separation motor 32*d*, more suitable liquid application can be performed.

When a plurality of thresholds are used and there is a possibility that a suitable binding strength cannot be obtained even at the limit of the specifications of the contact-separation motor 32*d*, the controller 100 can execute control so that the binding is performed again. Thus, the quality of maintaining the bound state can be enhanced.

In a case where it can be determined that it is desirable to increase the amount of liquid to be applied in the liquid application in comparison with the plurality of threshold values, the liquid application control data can be adjusted to increase the amount of liquid to be applied in the liquid application before the next binding.

Since the operation speed of the binding tool 320 can be added as the load information indicating the magnitude of the load of the contact-separation motor 32*d*, more various detections can be performed. Further, a torque change can be used as the load information.

As described above, the post-processing apparatus 3 according to the present embodiment acquires the magnitude of the load related to the pressure deformation of the sheet bundle Pb in performing the crimp binding, from the operation state of the driving source of the binding tool 320 and increases the amount of liquid to be applied in the liquid application when the load is high. Thus, the post-processing apparatus 3 can obtain a suitable binding strength.

Now, a description is given of a second embodiment of the present disclosure.

Next, a post-processing apparatus 3A according to a second embodiment is described with reference to FIGS. 13 to 21. In the following description, components like those of the first embodiment are denoted by like reference numerals, and redundant descriptions thereof may be omitted.

The post-processing apparatus 3A according to the second embodiment is different from the post-processing apparatus 3 according to the first embodiment in which the liquid applier 31 and the crimper 32 are arranged side by side. In the post-processing apparatus 3A according to the second embodiment, a liquid applier 131 is disposed alone at an upstream position in a direction in which the sheet P is conveyed. Such a configuration allows a given number of sheets P to be stacked after the liquid is applied and conveyed to the crimper 32 of the edge binder 25 disposed at a downstream position in the direction in which the sheet P is conveyed. Accordingly, the productivity of the binding process performed by the crimper 32 is enhanced. Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "opposite conveyance direction" in the following description. A direction that is orthogonal to the opposite conveyance direction and the thickness direction of the sheet P is defined as the "main scanning direction" or the "width direction of the sheet P."

Figure 13:
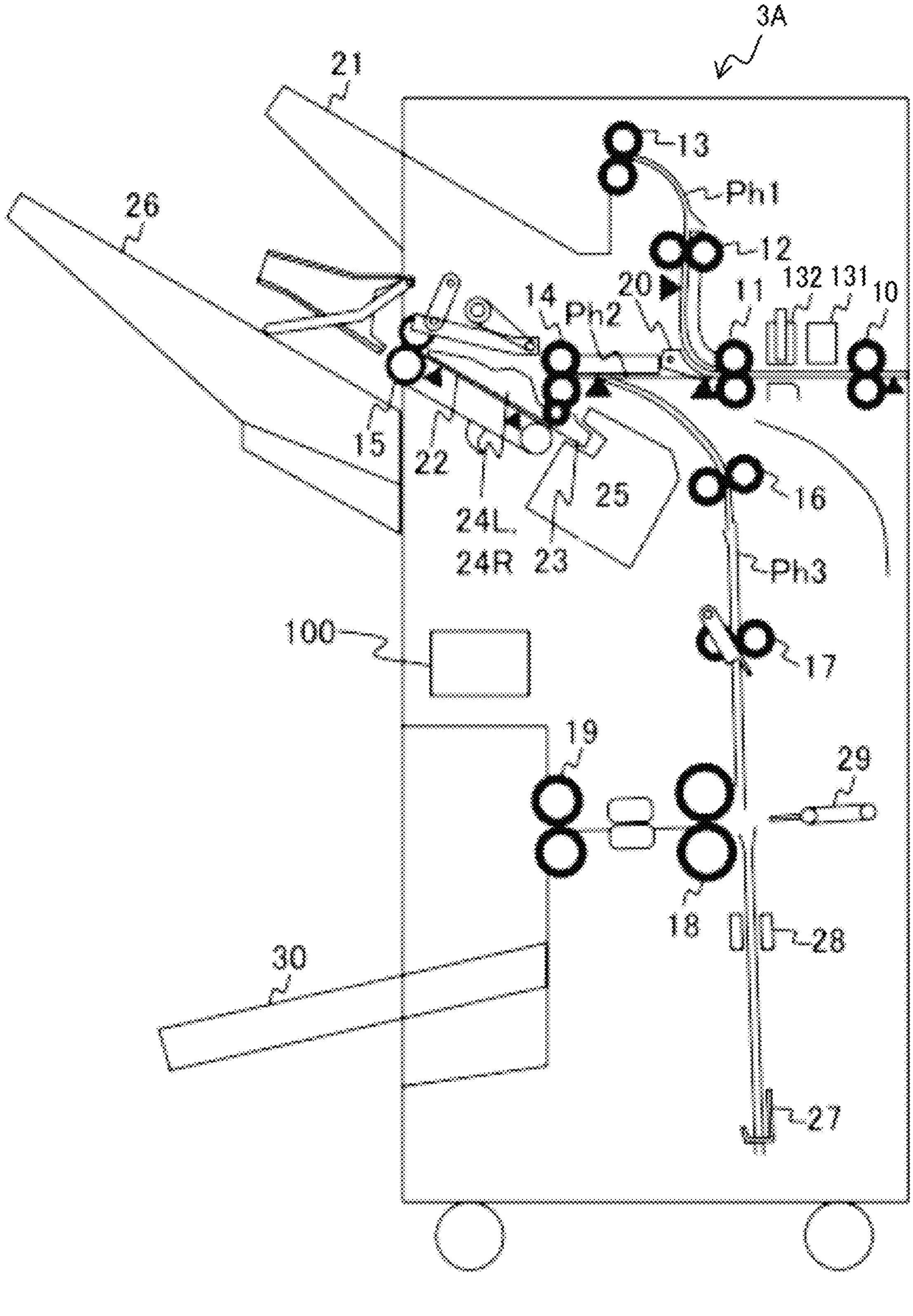
FIG. 13 is a diagram illustrating the internal configuration of a post-processing apparatus according to a second embodiment of the present disclosure.
Figure 14A:
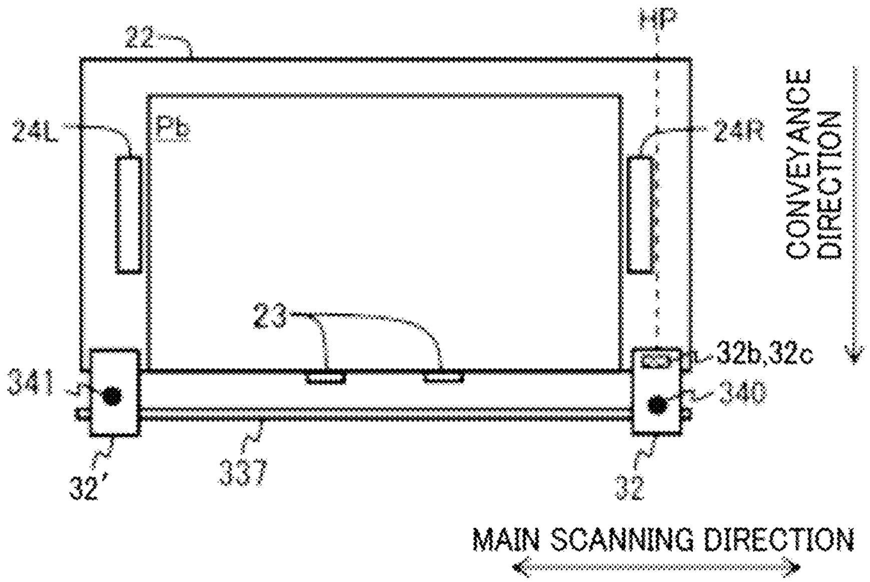
FIGS. 14A, 14B, and 14C are schematic views of an internal tray of the post-processing apparatus of FIG. 13 in a thickness direction of a sheet.
Figure 14B:
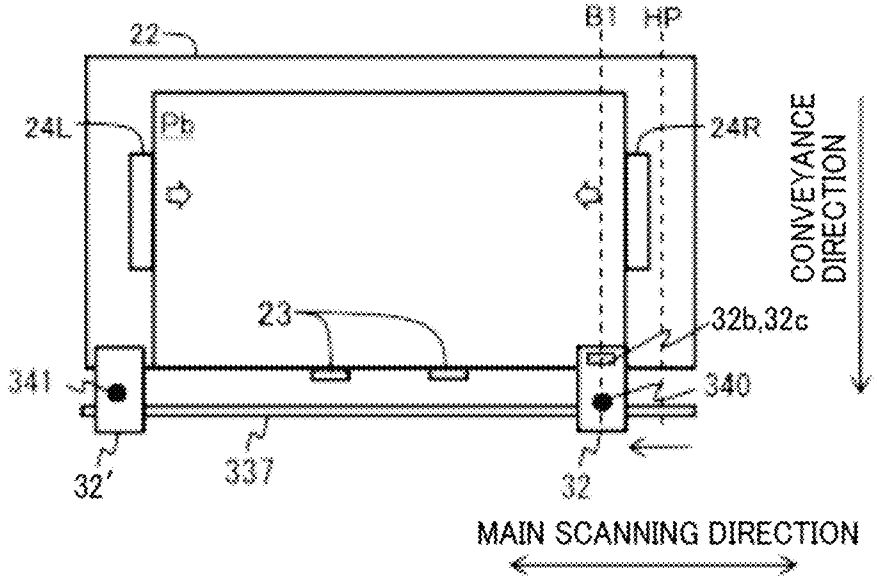
Figure 14C:
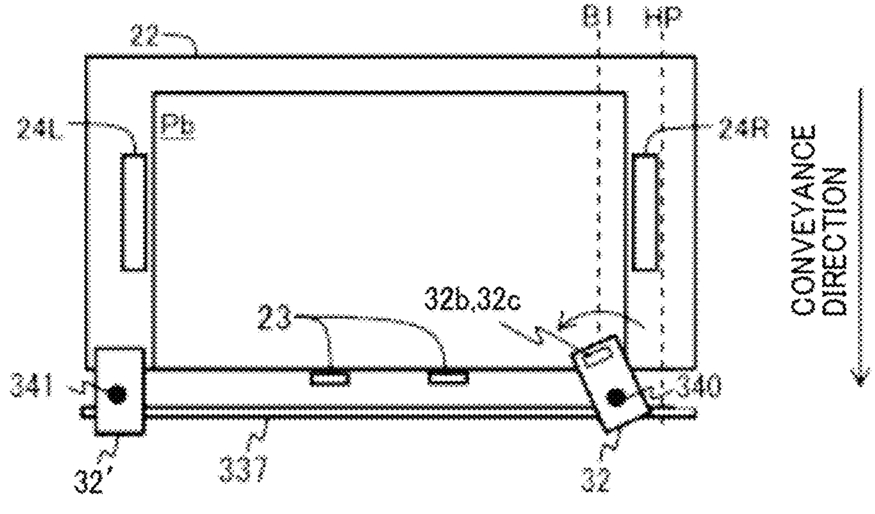

FIG. 13 is a diagram illustrating an internal configuration of the post-processing apparatus 3A according to the second embodiment of the present disclosure. As illustrated in FIGS. 14A to 14C, the edge binder 25 includes the crimper 32 and a stapler 32'. As illustrated in FIG. 13, the edge binder 25 including the crimper 32 and the stapler 32' is disposed downstream from the internal tray 22 in the conveyance direction. In addition, the crimper 32 and the stapler 32' are located to face a downstream end, in the conveyance direction, of the sheet bundle Pb placed on the internal tray 22 and move in the main scanning direction. Further, the crimper 32 and the stapler 32' are pivoted about an axis extending in the thickness direction of the sheet bundle Pb placed on the internal tray 22. In other words, the crimper 32 and the stapler 32' bind, at a desired angle, a desired position in the main scanning direction on the sheet bundle Pb placed on the internal tray 22 in, for example, corner oblique binding, parallel one-point binding, or parallel two-point binding.

The crimper 32 presses and deforms the sheet bundle Pb with serrate binding teeth 32*b* and 32*c* to bind the sheet bundle Pb. In the following description, such a binding way may be referred to as "crimp binding." In other words, the crimper 32 crimps and binds the sheet bundle Pb or performs the crimp binding on the sheet bundle Pb. On the other hand, the stapler 32' passes the staple through a binding position on the sheet bundle Pb placed on the internal tray 22 to staple the sheet bundle Pb.

Figure 15:
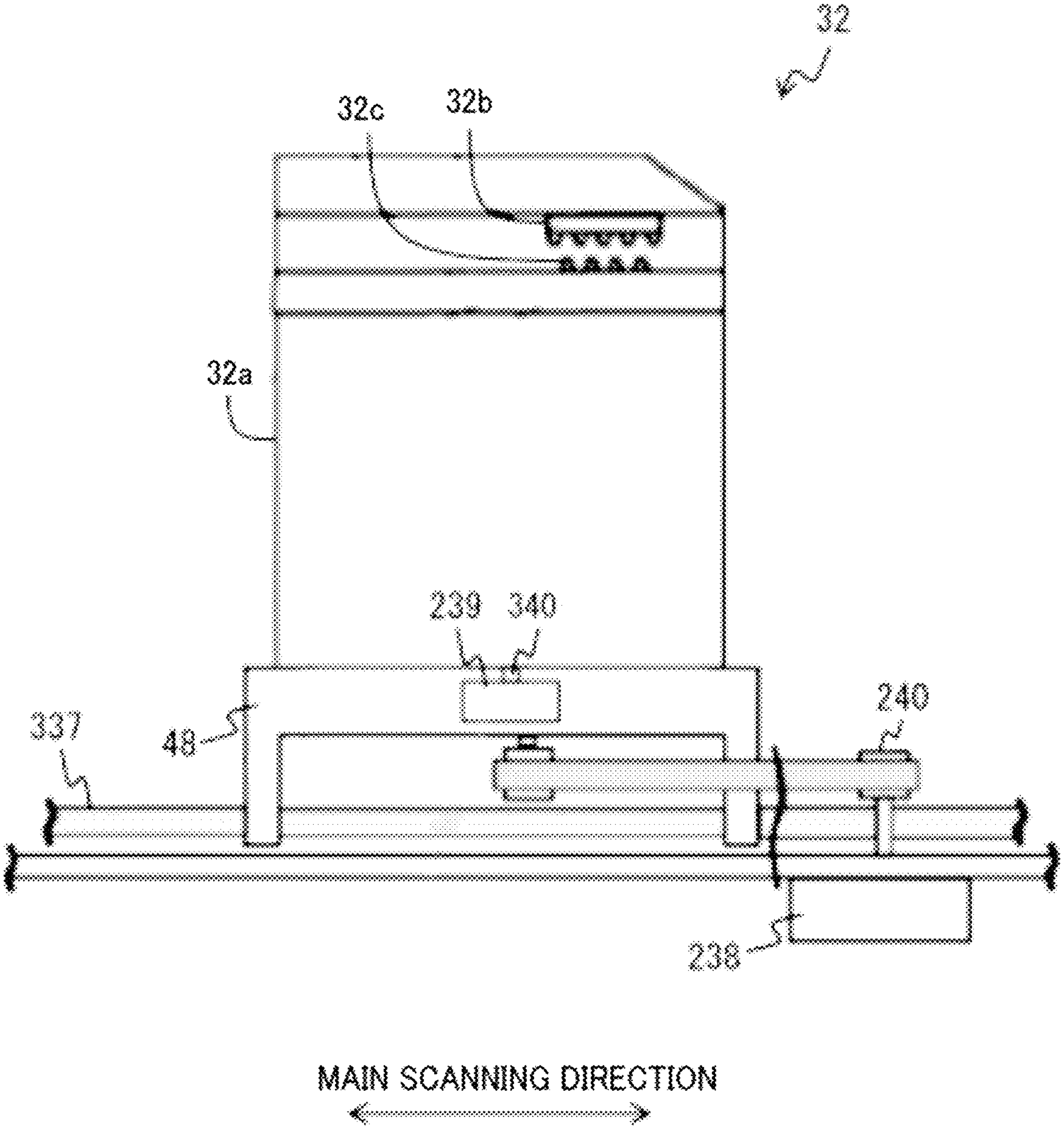
FIG. 15 is a schematic view of an upstream side of a crimper of the post-processing apparatus of FIG. 13 in a conveyance direction.

Each of FIGS. 14A to 14C is a view of the internal tray 22 in the thickness direction of the sheet bundle Pb. FIG. 15 is a schematic view of an upstream side of the crimper 32 in the conveyance direction. As illustrated in FIGS. 14A to 14C, the edge binder 25 including the crimper 32 and the stapler 32' is disposed downstream from the internal tray 22 in the conveyance direction. The crimper 32 moves in the main scanning direction along the surface of the sheet bundle Pb placed on the internal tray 22. The crimper 32 is also pivoted about a pivot 340 extending in the thickness direction of the sheet bundle Pb placed on the internal tray 22. Similarly, the stapler 32' moves in the main scanning direction of the sheet bundle Pb and is pivoted about a pivot 341 extending in the thickness direction of the sheet bundle Pb.

More specifically, as illustrated in FIG. 15, a guide rail 337 extending in the main scanning direction is disposed downstream from the internal tray 22 in the conveyance direction. The crimper 32 is moved in the main scanning direction along the surface of the sheet bundle Pb placed on the internal tray 22, in other words, along the guide rail 337, by a driving force transmitted from a crimper movement motor 238 by a drive transmission assembly 240 including a pulley and a timing belt. The pivot 340 is fixed to a bottom face of the crimping frame 32*a* that holds the components of the crimper 32. The pivot 340 is rotatably held by the base 48 on which the crimping frame 32*a* is disposed. When a driving force is transmitted from a pivot motor 239 to the pivot 340, the crimper 32 is pivoted about the pivot 340 extending in the thickness direction of the sheet P placed on the internal tray 22. The guide rail 337, the crimper movement motor 238, the pivot motor 239, the pivot 340, and the drive transmission assembly 240 construct a driving assembly of the crimper 32.

The crimper 32 moves between the standby position HP illustrated in FIG. 14A and a position where the crimper 32 faces the binding position B1 illustrated in FIGS. 14B and 14C. The standby position HP is away in the main scanning direction from the sheet bundle Pb placed on the internal tray 22. For example, in FIGS. 18A to 18C, the standby position HP is distanced to the right of the sheet bundle Pb along the main scanning direction. The binding position B1 is a position on the sheet bundle Pb placed on the internal tray 22. However, the specific position of the binding position B1 is not limited to the position illustrated in FIGS. 14B and 14C. The binding position B1 may be one or more positions along the main scanning direction at the downstream end, in the conveyance direction, of the sheet P.

The posture of the crimper 32 changes or is pivoted between a parallel binding posture illustrated in FIG. 14B and an oblique binding posture illustrated in FIG. 14C. The parallel binding posture is a posture of the crimper 32 in which the longitudinal direction of the pair of binding teeth 32*b* and binding teeth 32*c* (in other words, the rectangular crimping binding trace) is oriented in the main scanning direction. The oblique binding posture is a posture of the crimper 32 in which the length of the pair of binding teeth 32*b* and 32*c* (in other words, the rectangular crimp binding trace) is inclined with respect to the main scanning direction.

The pivot angle, which is an angle of the pair of binding teeth 32*b* and binding teeth 32*b* with respect to the main scanning direction, in the oblique binding posture is not limited to the angle illustrated in FIG. 14C. The pivot angle in the oblique binding posture may be any angle provided that the pair of binding teeth 32*b* and binding teeth 32*b* faces the sheet bundle Pb placed on the internal tray 22.

Figure 21:
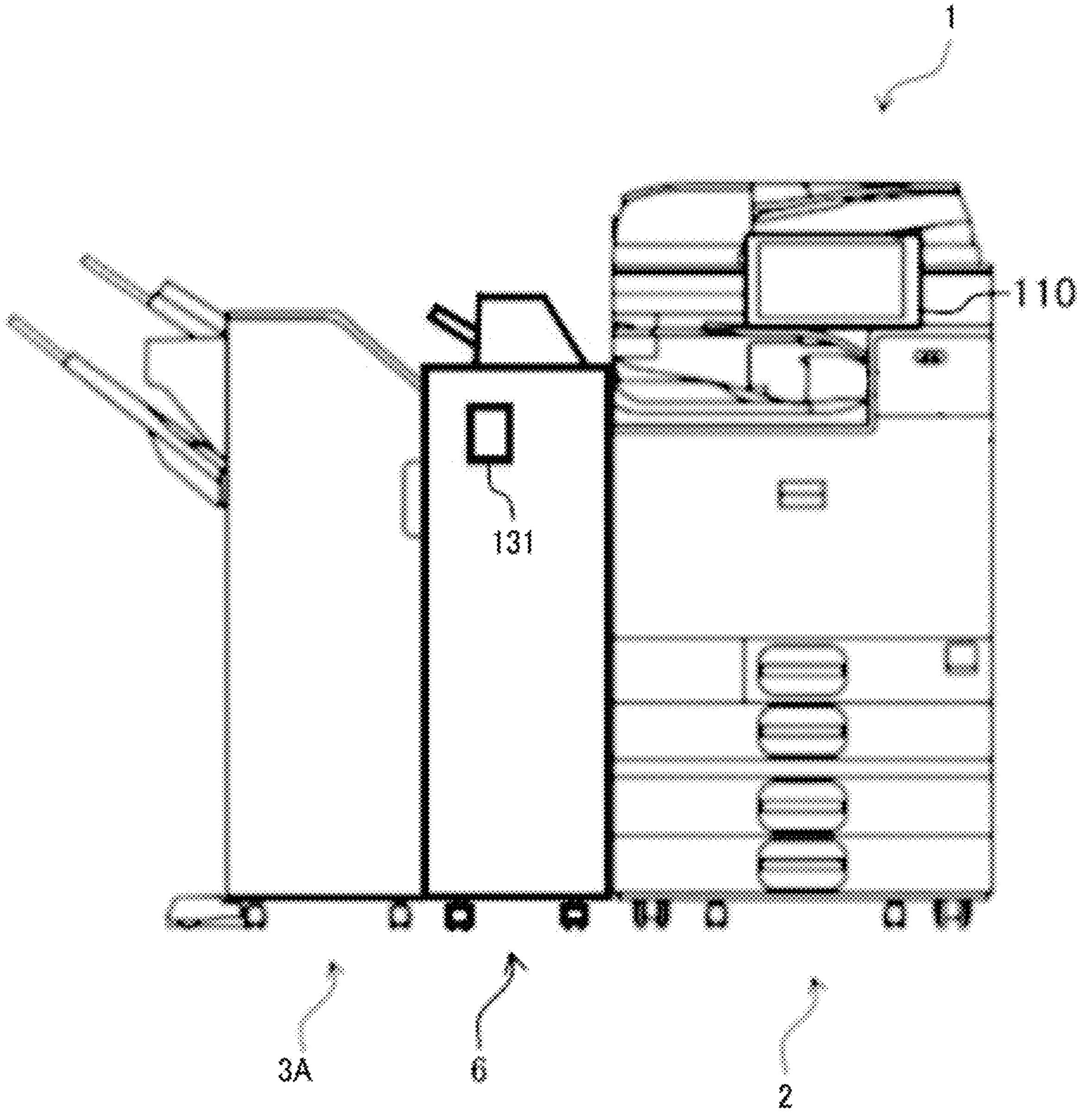
FIG. 21 is a diagram illustrating the overall configuration of an image forming system according to a modification of the embodiment illustrated in FIG. 1.

The post-processing apparatus 3A includes the liquid applier 131 and a hole punch 132 serving as a processor. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19. The liquid applier 131 and the hole punch 132 according to the present embodiment are disposed between the conveyance roller pairs 10 and 11. However, the arrangement of the liquid applier 131 and the hole punch 132 is not limited to the embodiment illustrated in FIG. 13. For example, in a case where an inserter 6 is disposed between the image forming apparatus 2 and the post-processing apparatus 3A as illustrated in FIG. 21, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 16A:
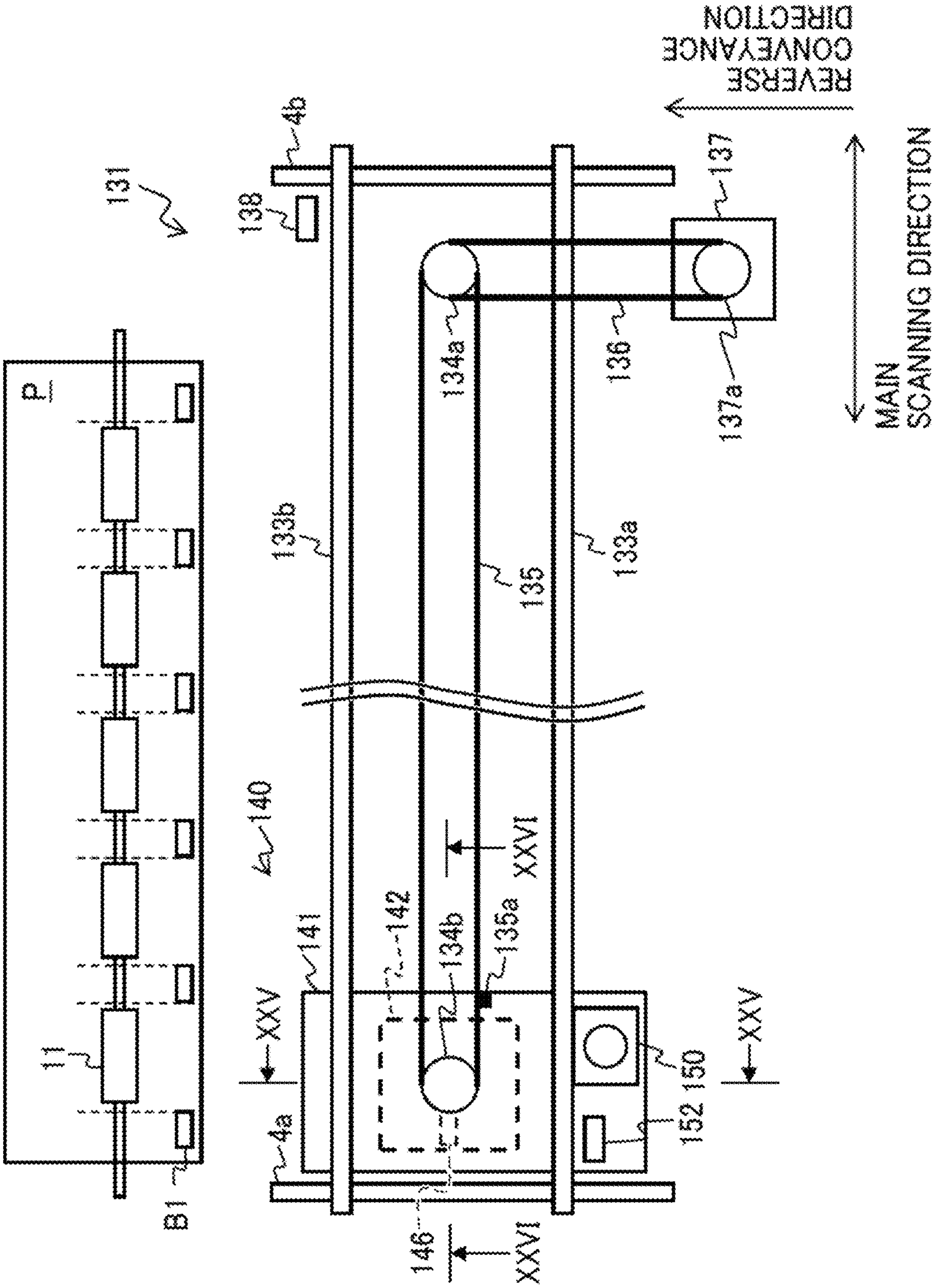
FIGS. 16A and 16B are schematic views of a liquid applier of the post-processing apparatus of FIG. 13 in the thickness direction of the sheet.

As illustrated in FIG. 16A, the conveyance roller pair 11 is located so as not to overlap, in the main scanning direction, the liquid application position B1 on the sheet P to which the liquid has been applied by a liquid application head 146 of the liquid applier 131. This is to prevent the amount of liquid at the liquid application position B1 from decreasing due to the plurality of roller pairs pressing the liquid application position B1 when the conveyance roller pair 11 conveys the sheet P. As a result, when the sheet P reaches the crimper 32 disposed downstream from the liquid applier 131 in the opposite conveyance direction, the amount of liquid at the liquid application position B1 is sufficient to maintain the binding strength. Accordingly, the binding strength of the sheet bundle Pb is prevented from decreasing due to a decrease in the amount of liquid at the liquid application position B1 while the sheet P is conveyed. In addition, the plurality of roller pairs of the conveyance roller pair 11 that is located so as not to overlap the liquid application position B1 on the sheet P in the main scanning direction prevents the conveying performance of the sheet P from being worse due to the adhesion of liquid to the plurality of roller pairs and further prevents a conveyance jam caused when the conveying performance of the sheet P is worsened. Although only the conveyance roller pair 11 has been described above, the plurality of roller pairs of the conveyance roller pairs 14 and 15 are preferably located so as not to overlap the liquid application position B1 on the sheet P in the main scanning direction, like the plurality of roller pairs of the conveyance roller pair 11.

The liquid applier 131 applies liquid (for example, water) to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processor disposed near the liquid applier 131 is not limited to the hole punch 132. Alternatively, the processor may be an inclination corrector that corrects an inclination or skew of the sheet P that is conveyed by the conveyance roller pairs 10 and 11.

Figure 16B:
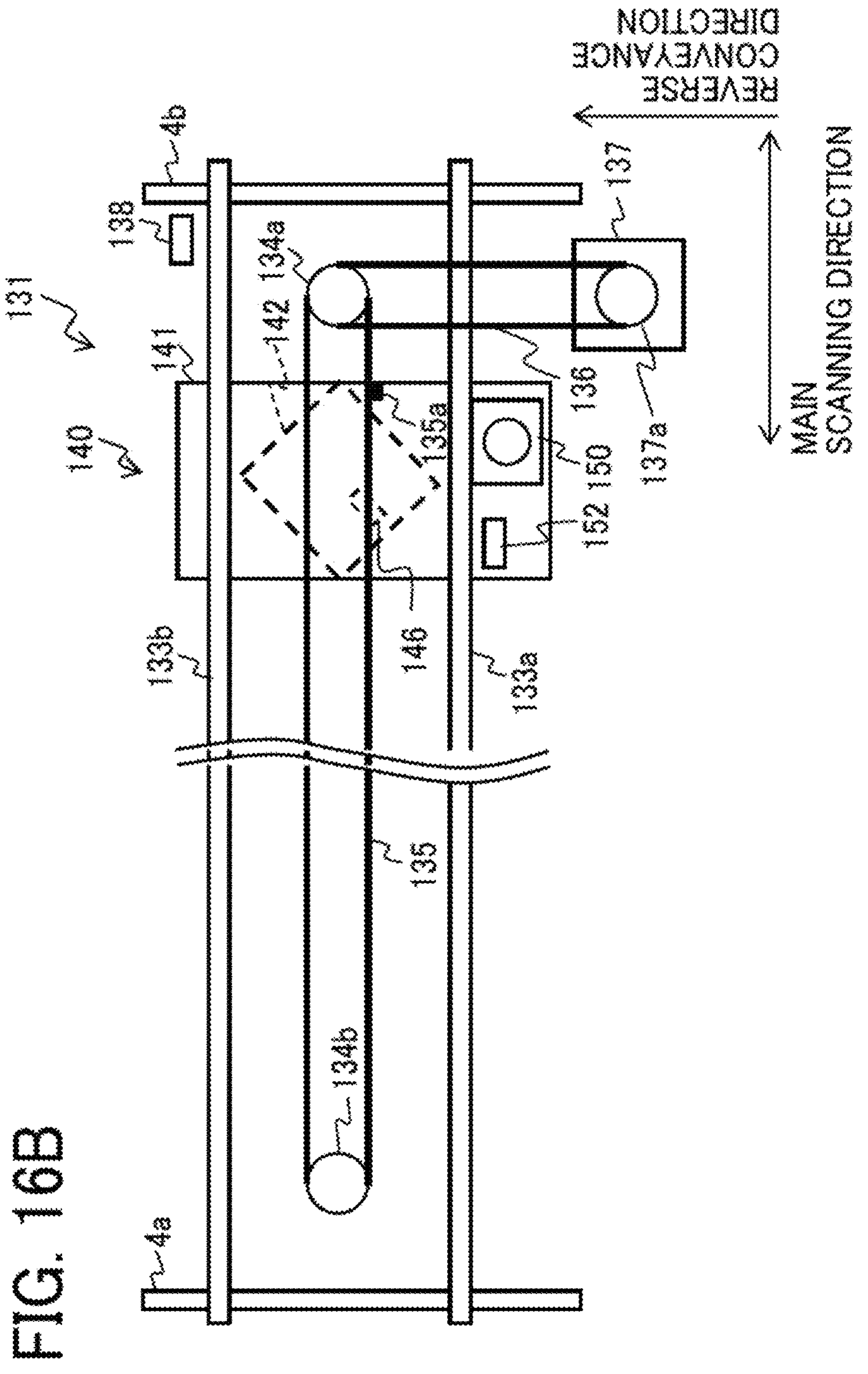
Figure 17A:
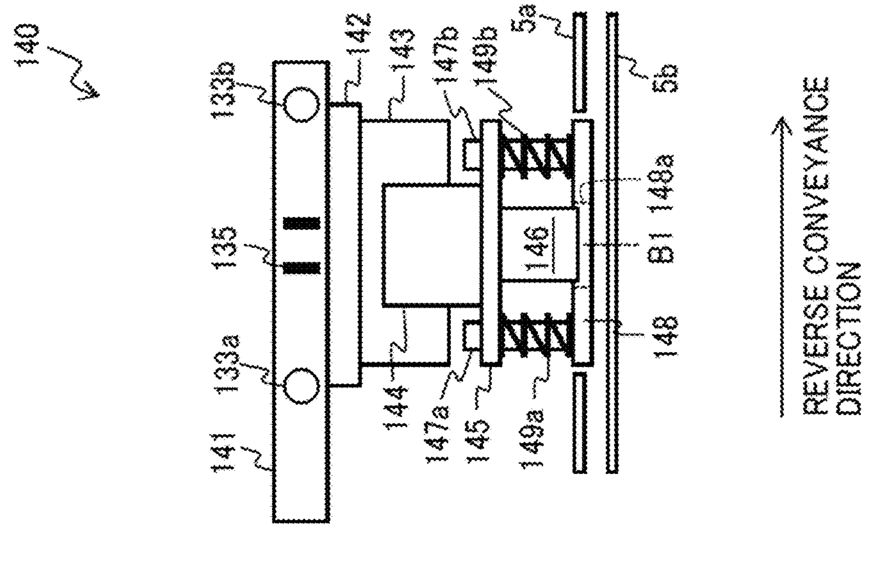
FIGS. 17A, 17B, and 17C are cross-sectional views of a liquid application unit of the liquid applier taken through XXV-XXV of FIG. 16A.
Figure 17B:
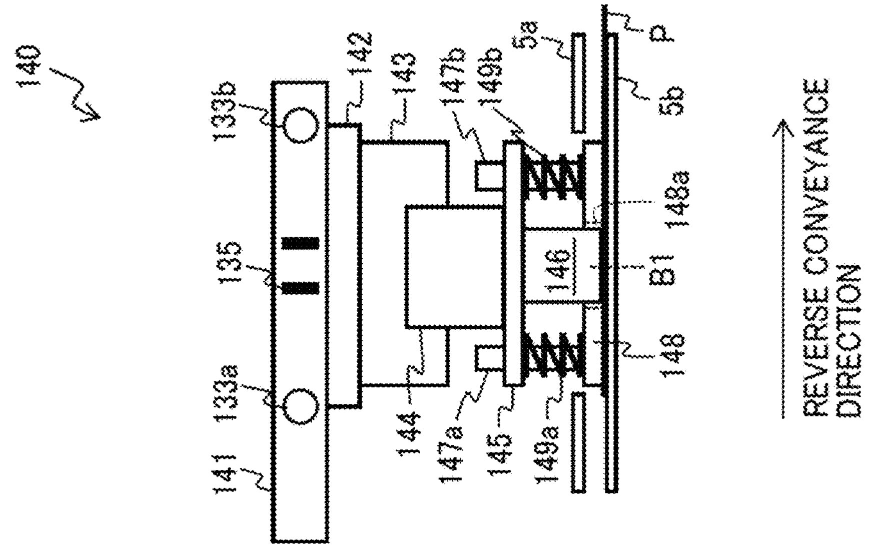
Figure 17C:
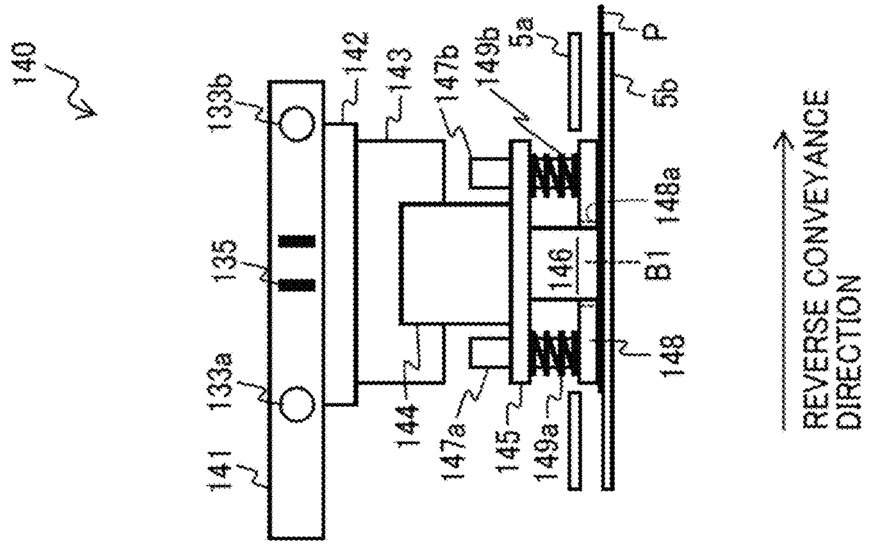
Figure 18A:
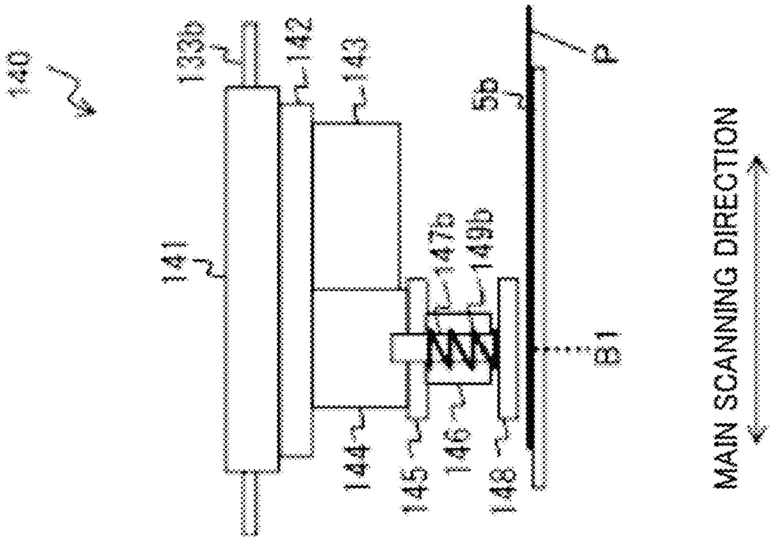
FIGS. 18A, 18B, and 18C are cross-sectional views of the liquid application unit of the liquid applier taken through XXVI-XXVI of FIG. 16A.
Figure 18B:
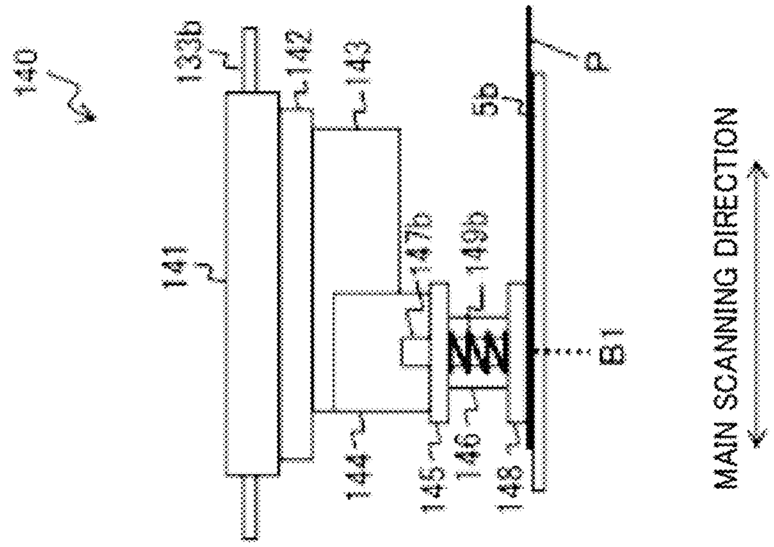
Figure 18C:
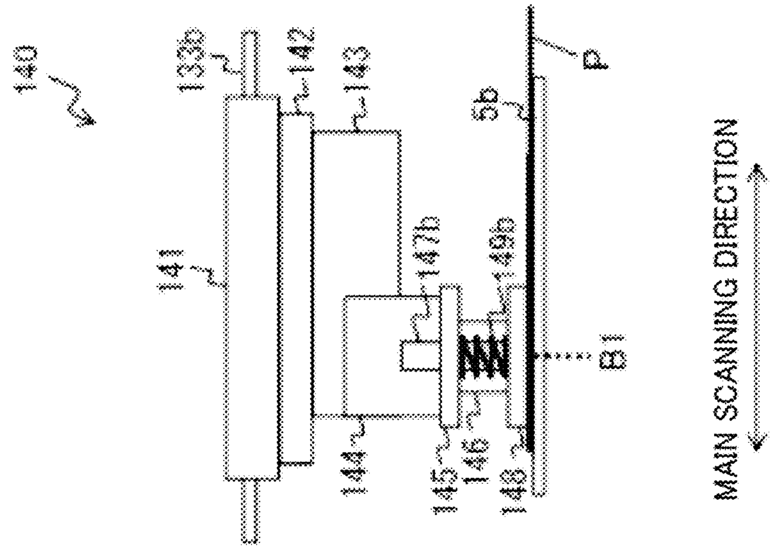

FIGS. 16A and 16B are views of the liquid applier 131 in the thickness direction of the sheet P, according to the second embodiment of the present disclosure. FIGS. 17A, 17B, and 17C are cross-sectional views of a liquid application unit 140 of the liquid applier 131 taken through XXV-XXV of FIG. 16A. FIGS. 18A, 18B, and 18C are cross-sectional views of the liquid application unit 140 of the liquid applier 131 taken through XXVI-XXVI of FIG. 16A. As illustrated in FIGS. 16A to 18C, the liquid applier 131 includes a pair of guide shafts 133*a* and 133*b*, a pair of pulleys 134*a* and 134*b*, endless annular belts 135 and 136, a liquid applier movement motor 137, a standby position sensor 138 (see FIG. 19), and a liquid application unit 140.

The guide shafts 133*a* and 133*b*, each extending in the main scanning direction, are apart from each other in the reverse conveyance direction. The pair of guide shafts 133*a* and 133*b* is supported by a pair of side plates 4*a* and 4*b* of the post-processing apparatus 3A. On the other hand, the pair of guide shafts 133*a* and 133*b* supports the liquid application unit 140 such that the liquid application unit 140 can move in the main scanning direction.

The pair of pulleys 134*a* and 134*b* is disposed between the guide shafts 133*a* and 133*b* in the reverse conveyance direction. On the other hand, the pulleys 134*a* and 134*b* are apart from each other in the main scanning direction. The pair of pulleys 134*a* and 134*b* is supported by a frame of the post-processing apparatus 3A so as to be rotatable about an axis extending in the thickness direction of the sheet P.

The endless annular belt 135 is entrained around the pair of pulleys 134*a* and 134*b*. The endless annular belt 135 is coupled to the liquid application unit 140 by a connection 135*a*. The endless annular belt 136 is entrained around the pulley 134*a* and a driving pulley 137*a* that is fixed to an output shaft of the liquid applier movement motor 137. The liquid applier movement motor 137 generates a driving force to move the liquid application unit 140 in the main scanning direction.

As the liquid applier movement motor 137 rotates, the endless annular belt 136 circulates around the pulley 134*a* and the driving pulley 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to the rotation direction of the liquid applier movement motor 137 being switched.

The standby position sensor 138 detects that the liquid application unit 140 has reached a standby position in the main scanning direction. The standby position sensor 138 then outputs a standby position signal indicating the detection result to the controller 100, which will be described below with reference to FIG. 19. The standby position sensor 138 is, for example, an optical sensor including a light emitter and a light receiver. The liquid application unit 140 at the standby position blocks an optical path between the light emitting unit and the light receiver. Then, the standby position sensor 138 outputs the standby position signal in response to the light output from the light emitter not being received by the light receiver. The specific configuration of the standby position sensor 138 is not limited to the configuration described above.

As illustrated in FIG. 13, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 faces the conveyance passage through the opening of the upper guide plate 5*a* to face the sheet P conveyed along the conveyance passage.

Figure 19:
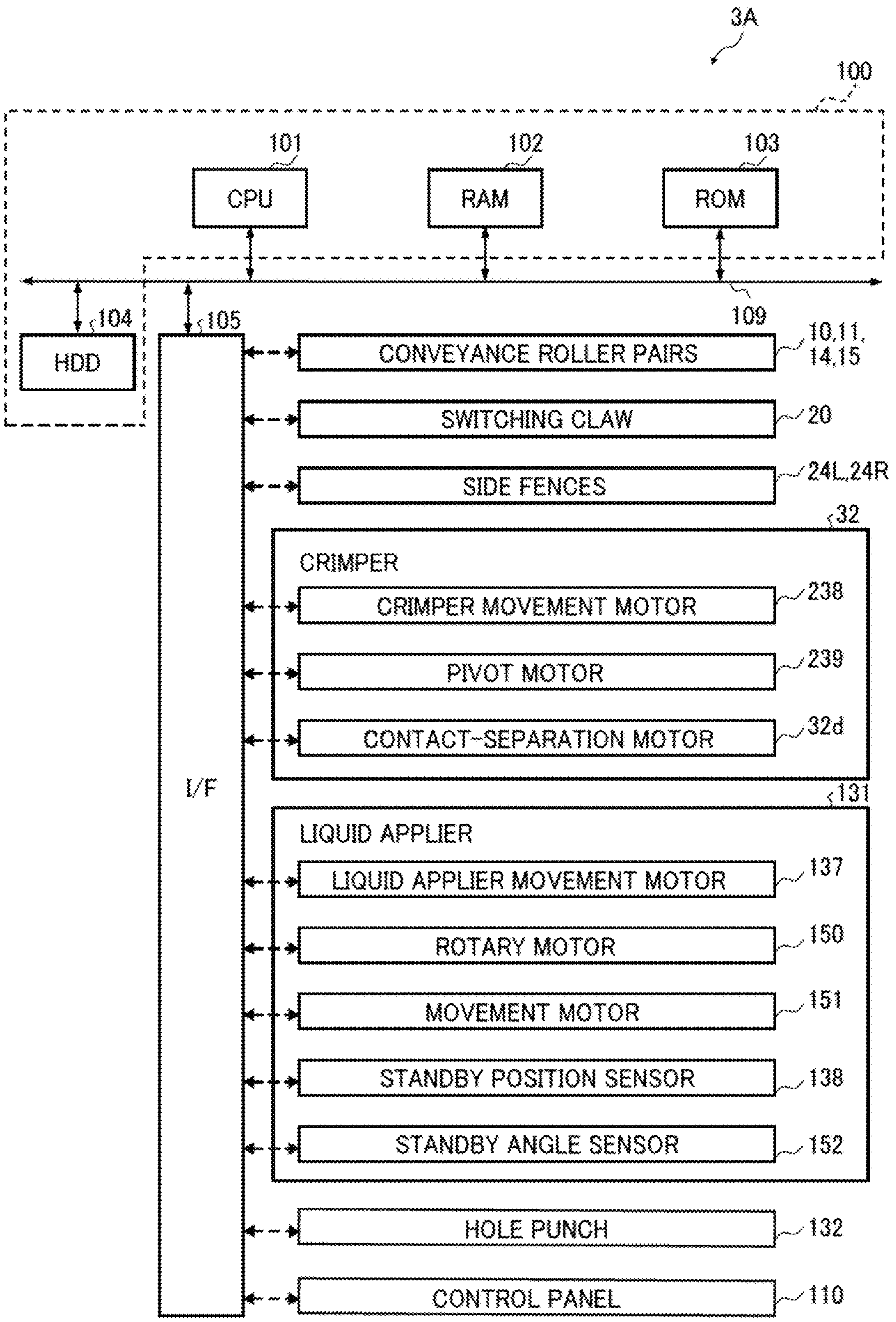
FIG. 19 is a block diagram illustrating a hardware configuration of the post-processing apparatus of FIG. 13 to control the operation of the post-processing apparatus.

As illustrated in FIGS. 16A to 18C, the liquid application unit 140 includes a base 141, a rotary bracket 142, a liquid storage tank 143, a mover 144, a holder 145, the liquid application head 146, columns 147*a* and 147*b*, a pressure plate 148, coil springs 149*a* and 149*b*, a rotary motor 150, a movement motor 151 illustrated in FIG. 19, and a standby angle sensor 152, which is also illustrated in FIG. 19.

The base 141 is supported by the pair of guide shafts 133*a* and 133*b* so as to be slidable in the main scanning direction. The base 141 is coupled to the endless annular belt 135 by the connection 135*a*. On the other hand, the base 141 supports the components of the liquid application unit 140 such as the rotary bracket 142, the liquid storage tank 143, the mover 144, the holder 145, the liquid application head 146, the columns 147*a* and 147*b*, the pressure plate 148, the coil springs 149*a* and 149*b*, the rotary motor 150, the movement motor 151, and the standby angle sensor 152.

The rotary bracket 142 is supported by a lower face of the base 141 so as to be pivotable about an axis extending in the thickness direction of the sheet P. The rotary bracket 142 is rotated with respect to the base 141 by a driving force transmitted from the rotary motor 150. On the other hand, the rotary bracket 142 supports the liquid storage tank 143, the mover 144, the holder 145, the liquid application head 146, the columns 147*a* and 147*b*, the pressure plate 148, and the coil springs 149*a* and 149*b*.

The standby angle sensor 152, which is also illustrated in FIG. 19, detects that the rotary bracket 142 has reached a standby angle. The standby angle sensor 152 then outputs a standby angle signal indicating the detection result to the controller 100. The standby angle is, for example, an angle for the parallel binding. The standby angle sensor 152 is, for example, an optical sensor including a light emitter and a light receiver. The rotary bracket 142 at the standby angle blocks an optical path between the light emitter and the light receiver. Then, the standby angle sensor 152 outputs the standby angle signal in response to the light output from the light emitter not being received by the light receiver. The specific configuration of the standby angle sensor 152 is not limited to the configuration described above.

Note that FIG. 16A illustrates the rotary bracket 142 in a position for the parallel binding that is performed by the crimper 32 disposed downstream from the liquid applier 131 in a direction in which the sheet P is conveyed. FIG. 16B illustrates the rotary bracket 142 in a position for the oblique binding (i.e., corner binding) that is performed by the crimper 32 disposed downstream from the liquid applier 131 in the direction in which the sheet P is conveyed.

The liquid storage tank 143 stores liquid to be applied to the sheet P. The mover 144 is supported by the liquid storage tank 143 so as to be movable (for example, up and down) in the thickness direction of the sheet P. The mover 144 is moved with respect to the liquid storage tank 143 by a driving force transmitted from the movement motor 151. The holder 145 is attached to a lower end of the mover 144. The liquid application head 146 projects from the holder 145 toward the conveyance passage (downward in the present embodiment). The liquid that is stored in the liquid storage tank 143 is supplied to the liquid application head 146. The liquid application head 146 is made of a material having a relatively high liquid absorption (for example, sponge or fiber).

The columns 147*a* and 147*b* project downward from the holder 145 around the liquid application head 146. The columns 147*a* and 147*b* can move relative to the holder 145 in the thickness direction. The columns 147*a* and 147*b* have respective lower ends holding the pressure plate 148. The pressure plate 148 has a through hole 148*a* at a position where the through hole 148*a* faces the liquid application head 146. The coil springs 149*a* and 149*b* are fitted around the columns 147*a* and 147*b*, respectively, between the holder 145 and the pressure plate 148. The coil springs 149*a* and 149*b* bias the columns 147*a* and 147*b* and the pressure plate 148 downward with respect to the holder 145.

As illustrated in FIGS. 17A and 18A, before the sheet P is conveyed to the position where the sheet P faces the opening of the upper guide plate 5*a*, the pressure plate 148 is positioned at or above the opening. Next, when the sheet P that is conveyed by the conveyance roller pairs 10 and 11 stops at a position where the liquid application position B1 on the sheet P faces the opening, the movement motor 151 is rotated in a first direction. As a result, the mover 144, the holder 145, the liquid application head 146, the columns 147*a* and 147*b*, the pressure plate 148, and the coil springs 149*a* and 149*b* are moved down together to allow the pressure plate 148 to contact the sheet P. Note that the liquid application position B1 corresponds to the binding position to be crimped and bound by the edge binder 25.

As the movement motor 151 keeps rotating in the first direction after the pressure plate 148 contacts the sheet P, the coil springs 149*a* and 149*b* are compressed to further move down the mover 144, the holder 145, the liquid application head 146, and the columns 147*a* and 147*b*. As a result, as illustrated in FIGS. 17B and 18B, a lower face of the liquid application head 146 contacts the sheet P through the through hole 148*a*. Then, the liquid contained in the liquid application head 146 is applied to the sheet P.

Further rotation of the movement motor 151 in the first direction further strongly presses the liquid application head 146 against the sheet P as illustrated in FIGS. 17C and 18C. Accordingly, the amount of liquid that is applied to the sheet P increases. In short, the liquid applier 131 changes the pressing force of the liquid application head 146 against the sheet P to adjust the amount of liquid that is applied to the sheet P.

On the other hand, the rotation of the movement motor 151 in a second direction opposite to the first direction moves up the mover 144, the holder 145, the liquid application head 146, the columns 147*a* and 147*b*, the pressure plate 148, and the coil springs 149*a* and 149*b* together. As a result, as illustrated in FIGS. 17A and 18A, the liquid application head 146 and the pressure plate 148 are separated from the sheet P. In other words, the liquid applier 131 includes the liquid application head 146 that can be separated from the sheet P.

FIG. 19 is a block diagram illustrating a hardware configuration of the post-processing apparatus 3A to control the operation of the post-processing apparatus 3A according to the second embodiment of the present disclosure. As illustrated in FIG. 19, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects the conveyance roller pairs 10, 11, 14, and 15, the switching claw 20, the side fences 24L and 24R, the crimper 32, the liquid applier 131, the hole punch 132, and the control panel 110 to the common bus 109. The controller 100 controls, via the I/F 105, the operations of the conveyance roller pairs 10, 11, 14, and 15, the switching claw 20, the side fences 24L and 24R, the crimper 32, the liquid applier 131, and the hole punch 132. Although FIG. 19 illustrates the components that execute the edge stitching process, the components that execute the saddle stitching process are also similarly controlled by the controller 100.

The control panel 110 includes an operating device that receives instructions input by a user and a display serving as a notifier that notifies the user of information. The operation unit includes, for example, hard keys and a touch screen overlaid on a display. The control panel 110 acquires information from the user through the operation unit and provides information to the user through the display.

Figure 20:
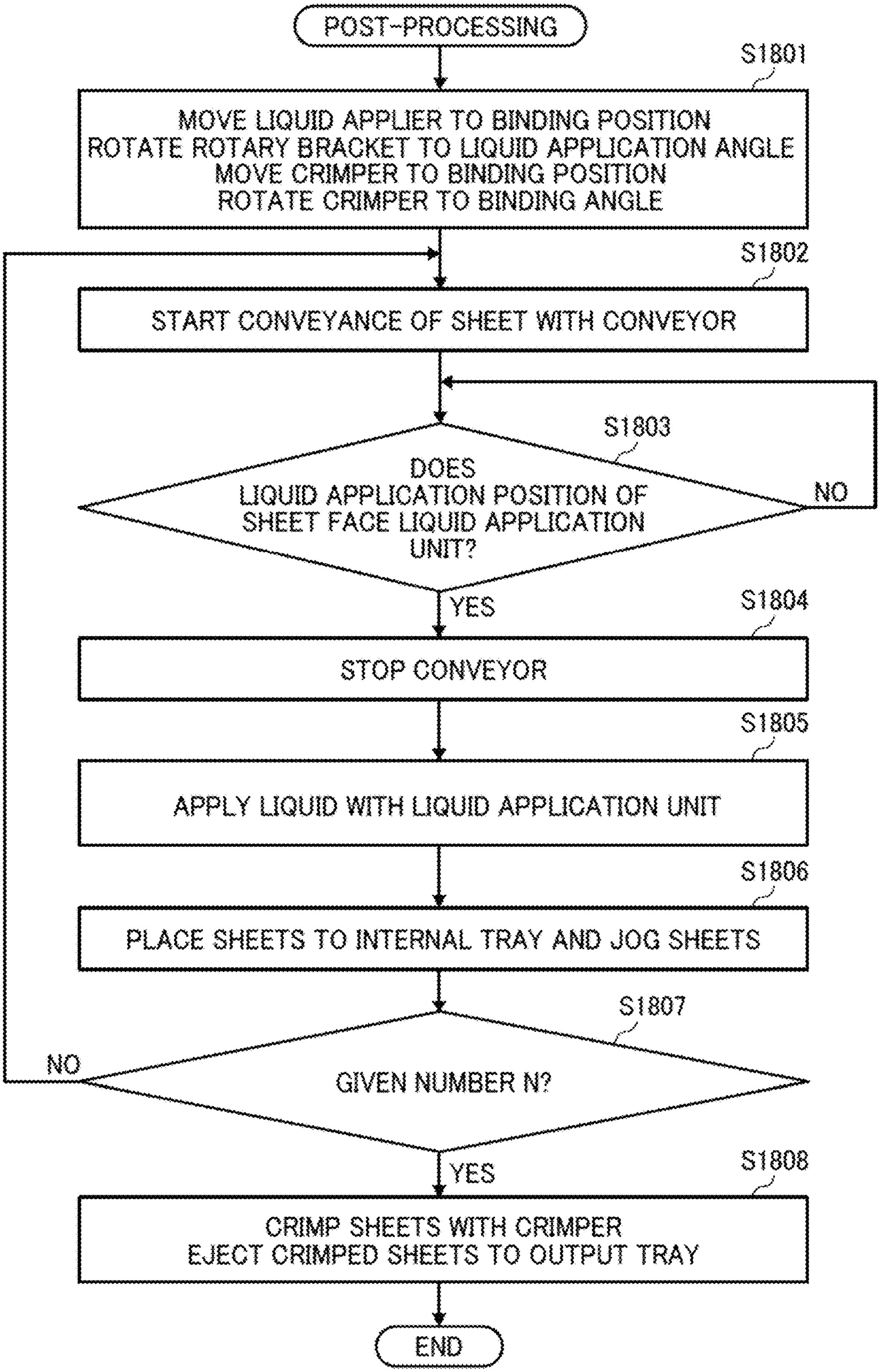
FIG. 20 is a flowchart of post-processing performed by the post-processing apparatus of FIG. 13.

FIG. 20 is a flowchart of post-processing performed by the post-processing apparatus 3A according to the second embodiment. Specifically, FIG. 20 is a flowchart of a process to execute the one-point binding illustrated in FIGS. 14A to 14C. For example, the controller 100 executes the post-processing illustrated in FIG. 20 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the binding position (i.e., the liquid application position B1), a binding angle (i.e., a liquid application angle), and a process executed in parallel with the liquid application process (i.e., punching a hole in the present embodiment). In the following description, the number of sheets P of the sheet bundle Pb may be referred to as a "given number N." Note that, at the start of the post-processing, the liquid application unit 140 is at the standby position HP corresponding to the standby position HP illustrated in FIGS. 12A to 12D whereas the rotary bracket 142 is held at the standby angle.

First, in step S1801, the controller 100 drives the liquid applier movement motor 137 to move the liquid application unit 140 in the main scanning direction such that liquid application head 146 moves from the standby position HP to a position where the liquid application head 146 can face the liquid application position B1 corresponding to the binding position B1 illustrated in FIGS. 14B and 14C. In addition, in step S1801, the controller 100 drives the rotary motor 150 to rotate the rotary bracket 142 such that the liquid application head 146 rotates from the standby angle to the liquid application angle. It is ascertained based on a pulse signal output from a rotary encoder of the liquid applier movement motor 137 that the liquid application head 146 has reached the position where the liquid application head 146 can face the liquid application position B1. Similarly, it is ascertained based on a pulse signal output from a rotary encoder of the rotary motor 150 that the liquid application head 146 has reached the liquid application angle.

Further, in step S1801, the controller 100 drives the crimper movement motor 238 to move the crimper 32 from the standby position HP to the position where the crimper 32 can face the binding position B1 as illustrated in FIGS. 14A and 14B. Furthermore, in step S1801, the controller 100 drives the pivot motor 239 to rotate the crimper 32 from the standby angle to the binding angle, which may be referred to as a crimp binding angle in the following description. It is ascertained based on a pulse signal output from a rotary encoder of the crimper movement motor 238 that the crimper 32 has reached the position where the crimper 32 can face the binding position B1. Similarly, it is ascertained based on a pulse signal output from a rotary encoder of the pivot motor 239 that the crimper 32 has reached the crimp binding angle.

Subsequently, in step S1802, the controller 100 drives the conveyance roller pairs 10 and 11 to start conveying the sheet P on which an image is formed by the image forming apparatus 2. In step S1803, the controller 100 determines whether the liquid application position B1 on the sheet P has faced the liquid application unit 140 (more specifically, the liquid application head 146). When the liquid application position B1 on the sheet P has not faced the liquid application head 146 (NO in step S1803), the controller 100 repeats the determination in step S1803. In other words, the controller 100 continues driving the conveyance roller pairs 10 and 11 until the liquid application position B1 on the sheet P faces the liquid application head 146. By contrast, when the liquid application position B1 on the sheet P has faced the liquid application head 146 (YES in step S1803), in step S1804, the controller 100 stops the conveyance roller pairs 10 and 11. It is ascertained based on a pulse signal output from a rotary encoder of a motor that drives the conveyance roller pairs 10 and 11 that the liquid application position B1 on the sheet P has faced the liquid application head 146.

In step S1805, the controller 100 executes the process of applying the liquid to the liquid application position B1 on the sheet P with the liquid application unit 140 (more specifically, the liquid application head 146). More specifically, the controller 100 rotates the movement motor 151 in the first direction to bring the liquid application head 146 into contact with the liquid application position B1 on the sheet P. In addition, the controller 100 changes the pressing force of the liquid application head 146 (in other words, the amount of rotation of the movement motor 151) depending on the amount of liquid that is applied to the sheet P.

The amount of liquid that is applied to the sheet P may be the same for all the sheets P of the sheet bundle Pb or may be different for each sheet P. For example, the controller 100 may apply a decreased amount of liquid to the sheet P conveyed later. The amount of rotation of the movement motor 151 may be ascertained based on a pulse signal output from a rotary encoder of the movement motor 151.

In step S1806, the controller 100 drives the conveyance roller pairs 10, 11, 14, and 15 to place the sheet P on the internal tray 22. The controller 100 moves the side fences 24L and 24R to align the position of the sheet bundle Pb placed on the internal tray 22 in the main scanning direction. In short, the controller 100 performs so-called jogging.

In step S1807, the controller 100 determines whether or not the number of sheets P placed on the internal tray 22 has reached the given number N of sheets indicated by the post-processing command. When the controller 100 determines that the number of sheets P placed on the internal tray 22 has not reached the given number N of sheets (NO in step S1807), the controller 100 executes the operations of steps S1802 to S1806 again.

By contrast, when the controller 100 determines that the number of sheets P that are placed on the internal tray 22 has reached the given number N of sheets (YES in step S1807), in step S1808, the controller 100 causes the crimper 32 to crimp and bind the binding position B1 (i.e., the liquid application position B1) on the sheet bundle Pb to which the liquid has been applied by the liquid applier 131. In addition, in step S1808, the controller 100 rotates the conveyance roller pair 15 to output the sheet bundle Pb thus crimped and bound to the output tray 26.

Then, the controller 100 drives the liquid applier movement motor 137 to move the liquid applier 131 to the standby position HP and drives the crimper movement motor 238 to move the crimper 32 to the standby position HP.

The embodiments of the present disclosure are applied to the edge binder 25 that executes the edge stitching as described above. However, the embodiments of the present disclosure may be applied to the saddle binder 28 that executes the saddle stitching.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Now, a description is given of some aspects of the present disclosure.

Initially, a description is given of a first aspect.

A medium processing apparatus includes: a crimper to press and deform a part of a medium bundle, which is formed by bundling a plurality of sheet-shaped media, to bind the medium bundle; a liquid applier to apply liquid to a position on the media at which binding is to be performed by the crimper; and a driving source to operate the crimper; and a binding load detector to detect a load of the crimper during the binding. The liquid applier adjusts an amount of the liquid to be applied to the media in accordance with a magnitude of the load during the binding detected by the binding load detector.

Now, a description is given of a second aspect.

In the medium processing apparatus according to the first aspect, the binding load detector compares the magnitude of the load with a plurality of threshold values to detect the magnitude of the load during the binding. The liquid applier adjusts the amount of the liquid to be applied, based on a magnitude of a compared threshold value of the plurality of threshold values.

Now, a description is given of a third aspect.

In the medium processing apparatus according to the second aspect, the crimper performs rebinding of pressing and deforming a same binding position of the medium bundle to bind the medium bundle again, based on a result of comparison between the magnitude of the load during the binding and the plurality of threshold values in the binding load detector.

Now, a description is given of a fourth aspect.

In the medium processing apparatus according to any one of the first to third aspects, the liquid applier applies the liquid based on the adjusted amount in liquid application subsequent to a determination of the magnitude of the load during the binding.

Now, a description is given of a fifth aspect.

In the medium processing apparatus according to any one of the first to fourth aspects, the magnitude of the load during the binding represents a change in speed of the driving source.

Now, a description is given of a sixth aspect.

In the medium processing apparatus according to any one of the first to fifth aspects, the magnitude of the load during the binding represents a change in torque of the driving source.

Now, a description is given of a seventh aspect.

In the medium processing apparatus according to any one of the first to sixth aspects, the magnitude of the load during the binding represents a change in value of current applied to the driving source.

Now, a description is given of an eighth aspect.

An image forming system includes: an image forming apparatus including an image former to form images on a plurality of media; and the medium processing apparatus according to any one of the first to seventh aspects, to press and deform the plurality of media, on which the images are formed by the image forming apparatus, to bind the plurality of media.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A medium processing apparatus, comprising:

a crimper configured to press and deform a part of a medium bundle, which is a plurality of sheet-shaped media bundled, to bind the medium bundle;

a liquid applier configured to apply liquid to a position on the media at which binding is to be performed by the crimper;

a driving source configured to operate the crimper; and a binding load detector configured to detect a load of the crimper during the binding, the liquid applier configured to adjust an amount of the liquid to be applied to the media in accordance with a magnitude of the load during the binding detected by the binding load detector.

2. The medium processing apparatus according to claim 1, wherein the binding load detector is configured to compare the magnitude of the load with a plurality of threshold values to detect the magnitude of the load during the binding, and wherein the liquid applier is configured to adjust the amount of the liquid to be applied, based on a magnitude of a compared threshold value of the plurality of threshold values.

3. The medium processing apparatus according to claim 2, wherein the crimper is configured to perform rebinding of pressing and deforming a same binding position of the medium bundle to bind the medium bundle again, based on a result of comparison between the magnitude of the load during the binding and the plurality of threshold values in the binding load detector.

4. The medium processing apparatus according to claim 1, wherein the liquid applier is configured to apply the liquid based on the adjusted amount in liquid application subsequent to a determination of the magnitude of the load during the binding.

5. The medium processing apparatus according to claim 1, wherein the magnitude of the load during the binding represents a change in speed of the driving source.

6. The medium processing apparatus according to claim 1, wherein the magnitude of the load during the binding represents a change in torque of the driving source.

7. The medium processing apparatus according to claim 1, wherein the magnitude of the load during the binding represents a change in value of current applied to the driving source.

8. An image forming system, comprising:

an image forming apparatus including an image former configured to form images on a plurality of media; and the medium processing apparatus according to claim 1, configured to press and deform the plurality of media, on which the images are formed by the image forming apparatus, to bind the plurality of media.

* * * * *